US011905302B2

(12) United States Patent
Lee et al.

(10) Patent No.: US 11,905,302 B2
(45) Date of Patent: Feb. 20, 2024

(54) PRELITHIATION AND METHOD OF MANUFACTURING PRELITHIATED ANODE USING THE SAME

(71) Applicant: KOREA INSTITUTE OF SCIENCE AND TECHNOLOGY, Seoul (KR)

(72) Inventors: Minah Lee, Seoul (KR); Jihyun Hong, Seoul (KR); Kyung Yoon Chung, Seoul (KR); Jin-Yoo Suh, Seoul (KR); Sang Ok Kim, Seoul (KR); Hyungseok Kim, Seoul (KR); Inyeong Kang, Seoul (KR); Ju Young Jang, Seoul (KR); Jin Kwan Choi, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 652 days.

(21) Appl. No.: 17/121,347

(22) Filed: Dec. 14, 2020

(65) Prior Publication Data

US 2021/0347787 A1 Nov. 11, 2021

(30) Foreign Application Priority Data

May 11, 2020 (KR) .......................... 10-2020-0055643

(51) Int. Cl.
*H01M 10/0525* (2010.01)
*C07F 1/02* (2006.01)
(Continued)

(52) U.S. Cl.
CPC .............. *C07F 1/02* (2013.01); *H01M 4/049* (2013.01); *H01M 4/366* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| 5,743,921 A | 4/1998 | Nazri et al. |
| 2015/0364795 A1* | 12/2015 | Stefan ............... H01M 10/0569 429/188 |
| 2019/0067732 A1* | 2/2019 | Zhamu .................... C01B 33/18 |

FOREIGN PATENT DOCUMENTS

| JP | 2017526106 A | 9/2017 |
| KR | 1020170020850 A | 2/2017 |

(Continued)

OTHER PUBLICATIONS

Holtstiege, F., et al., "Pre-Lithiation Strategies for Rechargeable Energy Storage Technologies: Concepts, Promises and Challenges," Batteries 4, 4, pp. 1-39, Jan. 23, 2018.

(Continued)

*Primary Examiner* — Wyatt P McConnell
(74) *Attorney, Agent, or Firm* — Rabin & Berdo, P.C.

(57) ABSTRACT

The present disclosure relates to a prelithiation solution and a method for preparing a prelithiated anode using the same. The prelithiation solution and the method for preparing a prelithiated anode using the same according to the present disclosure allow uniform intercalation of lithium ions throughout the anode chemically in a solution via a simple process of immersing the anode in a prelithiation solution having a sufficiently low redox potential as compared to an anode active material. A prelithiated anode prepared by this method has an ideal initial coulombic efficiency and a lithium secondary battery with a high energy density can be prepared based thereon. In addition, the prepared anode is advantageously applicable to large-scale production due to superior stability even in dry air.

12 Claims, 15 Drawing Sheets

(51) Int. Cl.
*H01M 4/36* (2006.01)
*H01M 4/04* (2006.01)
H01M 4/02 (2006.01)

(56) References Cited

FOREIGN PATENT DOCUMENTS

| WO | 2015127290 A1 | 8/2015 |
| WO | 2015192051 A1 | 12/2015 |
| WO | 2018208382 A1 | 11/2018 |
| WO | 2019144026 A1 | 7/2019 |

OTHER PUBLICATIONS

Sun, Y., et al., "High-capacity battery cathode prelithiation to offset initial lithium loss," Nature Energy, vol. 1, pp. 1-7, Jan. 11, 2016.

* cited by examiner

PRELITHIATION AND METHOD OF MANUFACTURING PRELITHIATED ANODE USING THE SAME

CROSS-REFERENCE TO RELATED APPLICATIONS

This application claims, under 35 U.S.C. § 119, the priority of Korean Patent Application No. 10-2020-0055643 filed on May 11, 2020 in the Korean Intellectual Property Office, the disclosure of which is incorporated herein by reference in its entirety.

TECHNICAL FIELD

The present disclosure relates to a prelithiation solution and a method for preparing a prelithiated anode using the same.

BACKGROUND

The energy density of a lithium-ion battery is determined by the number of Li ions transferred in an electrochemical reaction involved per cell volume (or mass) and the voltage of the cell. In a practical cell, irreversible electrochemical reduction of electrolytes occurs, which forms a solid-electrolyte interphase (SEI) on an anode in the initial cycle. This consumes the active lithium ions originally loaded in a cathode prior to cycling and thus lowers the coulombic efficiency of the battery operation.

The lower active lithium ion content significantly limits the available energy density of a battery in the following cycles. Graphite, a commercial anode for lithium-ion batteries, typically exhibits an initial coulombic efficiency of around 90%, whereas silicon and silicon oxides ($SiO_x$), which are next-generation high-capacity anode materials, exhibit an initial coulombic efficiency of lower than 80%, which prevents their commercial application.

To achieve a high initial coulombic efficiency and the maximum energy density, prelithiation prior to battery assembly has been attempted so that the loss of active lithium ions is compensated with extra lithium ions in the electrode. For this purpose, addition of solid lithium particles or lithium compounds as sacrificial lithium sources when preparing electrodes has been proposed. However, nanosized additives are difficult to synthesize at larger scale, typically require unconventional solvents for electrode preparation, and inevitably lead to the presence of impurities in the electrode, degrading net energy density.

An alternative approach is to directly apply lithium metal to prelithiate the prepared electrode. The physical contact of lithium metal with the electrode has the problem that it is difficult to precisely control the doping amount of lithium in the electrode after prelithiation. Although a method of electrochemically prelithiating the electrode by building a temporary cell having lithium metal as an anode has been proposed, it is not suitable for commercialization because an additional battery re-assembly step is required.

REFERENCES OF THE RELATED ART

Non-Patent Documents (Non-patent document 1) Holtstiege, F., Bärmann, P., Nolle, R., Winter, M. & Placke, T. Pre-lithiation strategies for rechargeable energy storage technologies: Concepts, promises and challenges. *Batteries* 4, 4 (2018).

(Non-patent document 2) Sun, Y. et al. High-capacity battery cathode prelithiation to offset initial lithium loss. *Nat. Energy* 1, 1-7 (2016).

SUMMARY

The present disclosure is directed to providing a highly reducing prelithiation solution capable of prelithiating a high-capacity anode for a lithium secondary battery with a reduction potential of lower than 0.3 V (versus Li/Li$^+$) via a chemical method, and a method for preparing a prelithiated anode using the same.

In an aspect, the present disclosure provides a prelithiation solution including a lithium organic complex of an aromatic hydrocarbon derivative, of which at least one benzene ring has a non-hydrogen substitute.

In another aspect, the present disclosure provides a method for preparing a prelithiated anode, which includes: (a) a step of preparing an anode including an anode active material layer formed on the surface of one or both sides of a current collector; and (b) a step of preparing a prelithiated anode by immersing the anode in a prelithiation solution comprising a lithium organic complex of an aromatic hydrocarbon derivative, of which at least one benzene ring has a non-hydrogen substitute.

In another aspect, the present disclosure provides a prelithiated anode using prelithiation solution described above.

In another aspect, the present disclosure provides a lithium secondary battery comprising: (a) prelithiated anode described above, (b) cathode, and (c) electrolyte.

In another aspect, the present disclosure provides a lithium-ion capacitor comprising: (a) prelithiated anode described above, (b) cathode, and (c) electrolyte.

The prelithiation solution and the method for preparing a prelithiated anode using the same according to the present disclosure allow uniform intercalation of lithium ions throughout the anode chemically in a solution via a simple process of immersing the anode in a prelithiation solution having a sufficiently low redox potential as compared to an anode active material. A prelithiated anode prepared by this method has an ideal initial coulombic efficiency exceeding 100% and a lithium-ion battery with an ideal energy density can be prepared based thereon. In addition, the prepared anode is advantageously applicable to large-scale production due to superior stability even in dry air.

DETAILED DESCRIPTION OF EMBODIMENTS

Figure 1A:
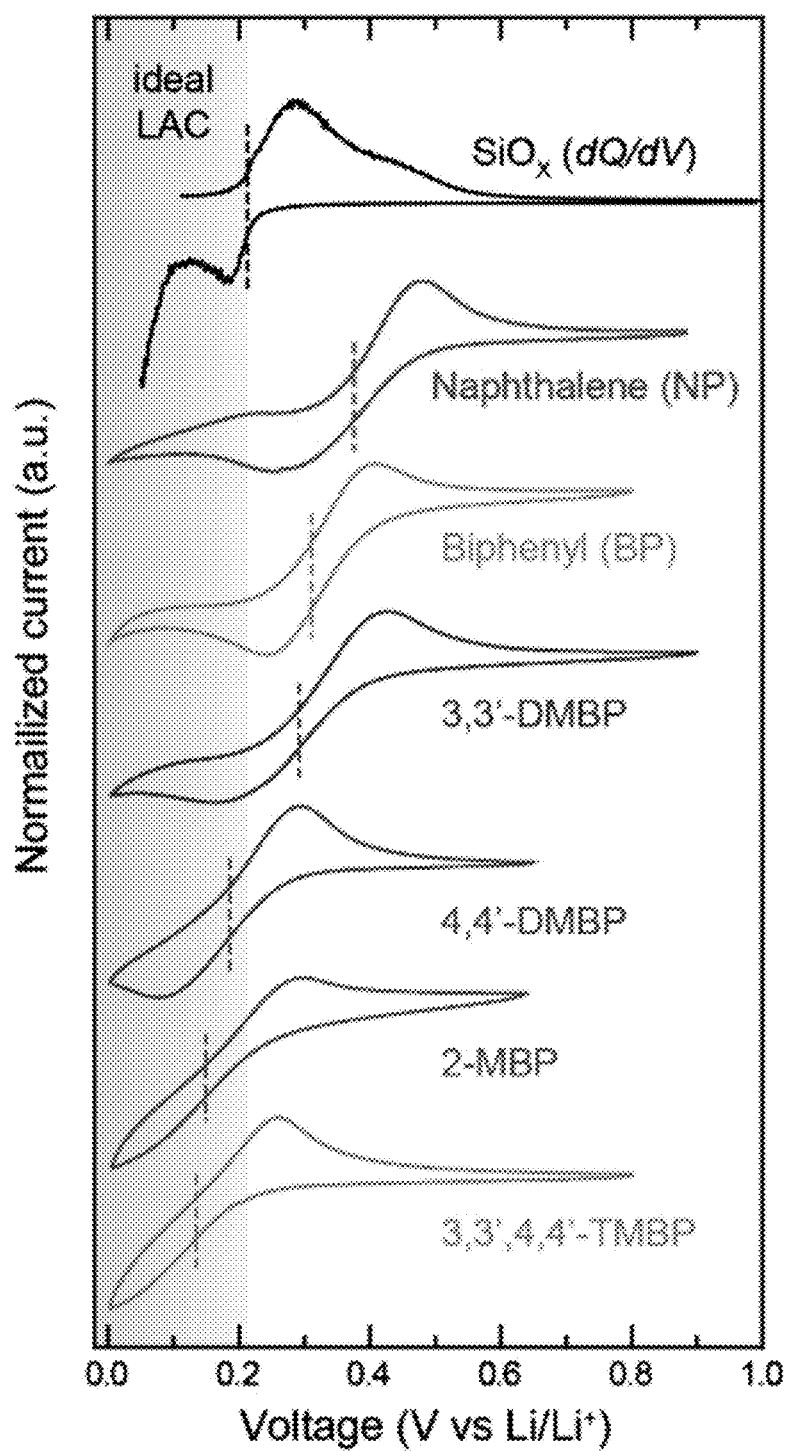
FIG. 1A shows a cyclic voltammetry analysis result of aromatic hydrocarbon compounds used for preparation of a prelithiation solution according to an exemplary embodiment of the present disclosure.

Hereinafter, many aspects and various exemplary embodiments of the present disclosure are described in more detail.

An aspect of the present disclosure provides a prelithiation solution including a lithium organic complex of an aromatic hydrocarbon derivative of which at least one benzene ring has a non-hydrogen substitute.

Unlike other prelithiation methods, chemical prelithiation is advantageously applicable to large-scale production because of unique reaction homogeneity and simplicity. With the existing chemical prelithiation method, it was possible to improve initial coulombic efficiency using a lithium-containing reductive compound or partly improve coulombic efficiency by forming an SEI, a protective film, during pretreatment. However, an ideal active lithium content could not be attained because sufficiently high reducing strength (sufficiently low redox potential) was not achieved. Especially, a coulombic efficiency of 100% has never been achieved through chemical lithiation of a silicon-based electrode (Si/$SiO_x$) with a low redox potential. However, it was found out that the prelithiation solution according to the present disclosure has a low redox potential of 0.25 V or lower and has a sufficient reducing strength for prelithiation through modification of the hydrocarbon molecular structure with an electron-donating substituent. The prelithiation solution according to the present disclosure enables successful chemical prelithiation of a silicon-based electrode and enables uniform insertion of lithium throughout the electrode.

More specifically, because a complex of an aromatic hydrocarbon not containing a substituent-attached benzene ring (naphthalene, anthracene, phenanthrene, tetracene, azulene, fluoranthene, phenylanthracene, diphenylanthracene, perylene, pyrene, triphenylene, bianthryl, biphenyl, terphenyl, quaterphenyl, stilbene, etc.) and a lithium ion has a high reduction potential (0.33 V or higher vs Li/Li$^+$) as compared to a silicon-based anode (~0.25 V), it is impossible to chemically lithiate the silicon-based anode and is inappropriate to prelithiate the silicon-based anode using the non-substituted aromatic hydrocarbons which merely form an SEI. Accordingly, for ideal chemical lithiation of the anode, it is necessary to adjust the electrochemical potential of the prelithiation solution to be lower than the potential of the anode. The redox potential of the prelithiation solution according to the present disclosure can be decreased sufficiently by using a complex of an aromatic hydrocarbon derivative, wherein the substituent bonded to the benzene ring of the aromatic hydrocarbon has been modified adequately, and a lithium ion and, through this, lithium ions can be chemically inserted into the anode, particularly a silicon-based anode. The silicon-based anode, which has been prelithiated with the prelithiation solution including the modified complex, has enhanced electrochemical reversibility, and solid-electrolyte interphase (SEI) formation and volume expansion, which are pointed out as the intractable problems of the silicon-based anode, can be mitigated.

The aromatic hydrocarbon derivative may be a polycyclic aromatic compound containing 10-22 carbons except the substituent. With an aromatic hydrocarbon containing less than 10 carbons, a solution of a complex of the aromatic hydrocarbon derivative and a Li ion cannot be formed because the reduction potential is lower than that of $Li/Li^+$. And, when the number of carbons exceeds 22, sufficient reducing strength cannot be achieved due to a high redox potential.

Specifically, the aromatic hydrocarbon derivative may be one or more selected from a group consisting of a naphthalene derivative, an anthracene derivative, a phenanthrene derivative, a tetracene derivative, an azulene derivative, a fluoranthene derivative, a phenylanthracene derivative, a perylene derivative, a pyrene derivative, a triphenylene derivative, a biphenyl derivative, a terphenyl derivative and a stilbene derivative. More specifically, it may be one or more selected from a naphthalene derivative and a biphenyl derivative.

The aromatic hydrocarbon derivative may contain one or more substituent selected from $C_1$-$C_6$ alkyl, $C_6$-$C_{20}$ aryl, $C_1$-$C_{10}$ alkoxy and $C_1$-$C_6$ alkyl halide. Specifically, $C_1$-$C_4$ alkyl may be contained as a substituent.

The substituent of the aromatic hydrocarbon derivative may have the same structure as the original molecule of the aromatic hydrocarbon. For example, an anthracene derivative may contain an anthryl group as a substituent, and a biphenyl derivative may contain biphenyl as a substituent.

The aromatic hydrocarbon derivative may be one or more selected from a group consisting of compounds represented by any of Chemical Formula 1 and Chemical Formula 2.

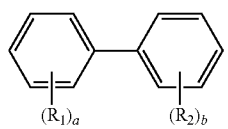

[Chemical Formula 1]

In Chemical Formula 1, each of $R_1$ and $R_2$, which are identical to or different from each other, is $C_1$-$C_6$ alkyl, $C_6$-$C_{20}$ aryl, $C_1$-$C_{10}$ alkoxy or $C_1$-$C_6$ alkyl halide, each of a and b is independently an integer from 0 to 5, wherein at least one is not 0, if a is 2 or greater, two or more $R_1$'s are identical to or different from each other, and if b is 2 or greater, two or more $R_2$'s are identical to or different from each other,

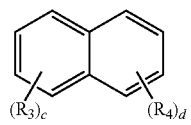

[Chemical Formula 2]

In Chemical Formula 2, each of $R_3$ and $R_4$, which are identical to or different from each other, is $C_1$-$C_6$ alkyl, $C_6$-$C_{20}$ aryl, $C_1$-$C_{10}$ alkoxy or $C_1$-$C_6$ alkyl halide, each of c and d is independently an integer from 0 to 5, wherein at least one is not 0, if c is 2 or greater, two or more $R_3$'s are identical to or different from each other, and if d is 2 or greater, two or more $R_4$'s are identical to or different from each other.

A prelithiation solution satisfying the above condition is advantageous in a preparation process because a protective layer is formed on the surface of the electrode and the formed protective layer confers stability to the prelithiated electrode under dry air.

According to a specific exemplary embodiment, in Chemical Formula 1, each of $R_1$ and $R_2$, which are identical to or different from each other, is $C_1$-$C_4$ alkyl, each of a and b is independently an integer from 0 to 2, wherein at least one is not 0, if a is 2 or greater, two or more $R_1$'s are identical to or different from each other, and if b is 2 or greater, two or more $R_2$'s are identical to or different from each other.

And, in Chemical Formula 2, each of $R_3$ and $R_4$, which are identical to or different from each other, is $C_1$-$C_4$ alkyl, each of c and d is independently an integer from 0 to 2, wherein at least one is not 0, if c is 2 or greater, two or more $R_3$'s are identical to or different from each other, and if d is 2 or greater, two or more $R_4$'s are identical to or different from each other.

Under the above-described condition, a complex of a lithium ion (or two lithium ions) and the aromatic hydrocarbon derivative can be used for chemical prelithiation of a silicon-based anode and has improved initial coulombic efficiency as compared to a pristine silicon-based anode because of a sufficiently low redox potential as compared to the silicon-based anode.

According to a specific exemplary embodiment, the aromatic hydrocarbon derivative may be one or more selected from a group consisting of compounds represented by any of Chemical Formulas 1-1 to 1-3 and 2-1 to 2-3.

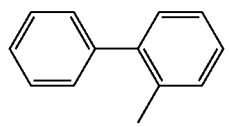

[Chemical Formula 1-1]

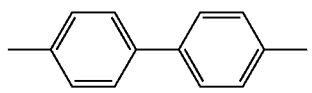

[Chemical Formula 1-2]

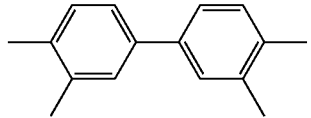

[Chemical Formula 1-3]

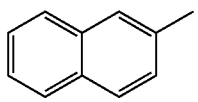

[Chemical Formula 2-1]

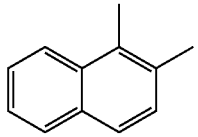

[Chemical Formula 2-2]

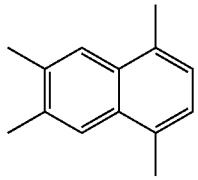

[Chemical Formula 2-3]

Since a prelithiation solution including the aromatic hydrocarbon derivative represented by the above chemical formulas exhibits a redox potential of 0.2 V or lower, it has reducing strength sufficient for chemical prelithiation of the silicon-based anode and exhibits an initial coulombic efficiency close to 100%. That is to say, since the irreversible lithium loss of the pristine $SiO_x$ anode is successfully compensated for, it exhibits almost the same charge capacity and discharge capacity values.

A solvent of the prelithiation solution is one or more selected from a group consisting of a cyclic ether and a linear ether. Specifically, it may be a linear ether. The cyclic ether may be one or more selected from a group consisting of dioxolane, methyldioxolane, dimethyldioxolane, vinyldioxolane, methoxydioxolane, ethylmethyldioxolane, oxane, dioxane, trioxane, tetrahydrofuran, methyltetrahydrofuran, dimethyltetrahydrofuran, dimethoxytetrahydrofuran, ethoxytetrahydrofuran, dihydropyran, tetrahydropyran, hexamethylene oxide, furan, dihydrofuran, dimethoxybenzene and dimethyloxetane, and the linear ether may be one or more selected from a group consisting of dimethyl ether, diethyl ether, ethyl methyl ether, ethyl propyl ether, dipropyl ether, diisopropyl ether, dibutyl ether, diisobutyl ether, ethyl tert-butyl ether, dimethoxymethane, trimethoxymethane, dimethoxyethane, diethoxyethane, dimethoxypropane, diethylene glycol dimethyl ether, diethylene glycol ethyl methyl ether, diethylene glycol isopropyl methyl ether, diethylene glycol butyl methyl ether, diethylene glycol diethyl ether, diethylene glycol tert-butyl ethyl ether, triethylene glycol dimethyl ether, tetraethylene glycol dimethyl ether, ethylene glycol ethyl methyl ether, ethylene glycol divinyl ether, diethylene glycol divinyl ether and triethylene glycol divinyl ether, although not being limited thereto.

The concentration of the complex in the prelithiation solution may be 0.01-5 M, specifically 0.1-2 M, more specifically 0.2-1 M.

The complex may have a redox potential lower than 0.25 V. When the redox potential is lower than 0.25 V, the complex has sufficient reducing strength because the redox potential is lower than that of the $Si/SiO_x$ anode and can be appropriately used for prelithiation.

Another aspect of the present disclosure provides a method for preparing a prelithiated anode, which includes: (a) a step of preparing an anode including an anode active material layer formed on the surface of one or both sides of a current collector; and (b) a step of preparing a prelithiated anode by immersing the anode in a prelithiation solution comprising a lithium organic complex of an aromatic hydrocarbon derivative, of which at least one benzene ring has a non-hydrogen substitute. The method for preparing a prelithiated anode of the present disclosure is applicable to large-scale production of a lithium secondary battery unlike the existing methods requiring strict conditions for prelithiation, because a prelithiated anode can be prepared via a simple process of immersing an anode in a prelithiation solution and the prelithiated anode is stable for a long time in dry air because of a protective layer formed on the surface of the electrode.

Specifically, the redox potential of the complex may have lower than the redox potential of the anode active material. Due to the sufficient reducing strength, prelithiation reaction whereby active lithium is uniformly inserted into the anode and protective film is formed can be facilitated, and the decomposition of electrolytes and unwanted SEI formation after battery assembly can be therefore prevented. The aromatic hydrocarbon derivative may be a $C_{10}$-$C_{22}$ polycyclic aromatic compound.

The aromatic hydrocarbon derivative may be one or more selected from a group consisting of compounds represented by any of Chemical Formula 1 and Chemical Formula 2.

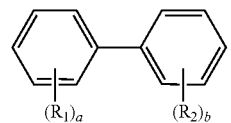

[Chemical Formula 1]

In Chemical Formula 1, each of $R_1$ and $R_2$, which are identical to or different from each other, is $C_1$-$C_6$ alkyl, $C_6$-$C_{20}$ aryl, $C_1$-$C_{10}$ alkoxy or $C_1$-$C_6$ alkyl halide, each of a and b is independently an integer from 0 to 5, wherein at least one is not 0, if a is 2 or greater, two or more $R_1$'s are identical to or different from each other, and if b is 2 or greater, two or more $R_2$'s are identical to or different from each other,

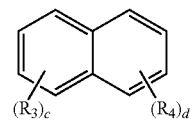

[Chemical Formula 2]

In Chemical Formula 2, each of $R_3$ and $R_4$, which are identical to or different from each other, is $C_1$-$C_6$ alkyl, $C_6$-$C_{20}$ aryl, $C_1$-$C_{10}$ alkoxy or $C_1$-$C_6$ alkyl halide, each of c and d is independently an integer from 0 to 5, wherein at least one is not 0, if c is 2 or greater, two or more $R_3$'s are identical to or different from each other, and if d is 2 or greater, two or more $R_4$'s are identical to or different from each other.

The aromatic hydrocarbon derivative may be one or more selected from a group consisting of compounds represented by any of Chemical Formulas 1-1 to 1-3 and 2-1 to 2-3.

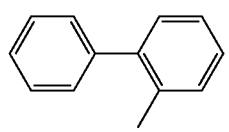

[Chemical Formula 1-1]

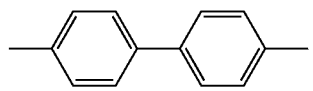

[Chemical Formula 1-2]

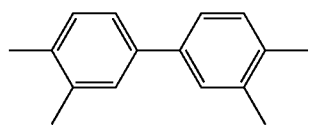

[Chemical Formula 1-3]

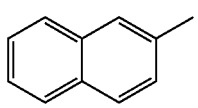

[Chemical Formula 2-1]

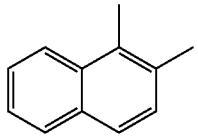

[Chemical Formula 2-2]

[Chemical Formula 2-3]

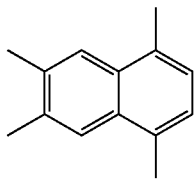

The complex may have a redox potential lower than 0.25 V.

The description of the prelithiation solution including a complex of a lithium ion and an aromatic hydrocarbon derivative will be omitted because it is the same as given above with regard to the prelithiation solution.

The anode active material may be one or more selected from a group consisting of graphite, hard carbon, activated carbon, carbon nanotube, amorphous carbon, silicon, silicon oxide ($SiO_x$), silicide, silicon alloy, silicon carbide, silicon nitride, Ge, Sn, Sb, Al, Ag, Au and $TiO_2$, specifically one or more selected from a group consisting of carbon, silicon and silicon oxide. The silicon alloy may be an alloy of one or more metal element selected from Fe, Co, Ni, Ca, Mg, Cu, Al, Ti and Mn and a silicon element. The anode active material may also be used as an anode additive or a scaffold.

The immersion of the step (b) may be performed at a temperature of −10 to 80° C., specifically at a temperature of 10-50° C. In a temperature range of −10 to 80° C., the redox potential of the complex is typically decreased as the temperature increases, and the improved reducing strength may lead to enhanced initial coulombic efficiency. When the immersion is performed at a temperature below −10° C., prelithiation may not occur due to excessively high redox potential. And, when the immersion is performed at a temperature higher than 80° C., precipitation of lithium metal may occur or the solvent may boil.

The immersion of the step (b) may be performed for 0.01-1440 minutes, specifically for 1-600 minutes, more specifically for 5-240 minutes. Within 5 minutes after the immersion, the initial coulombic efficiency of the prepared anode is increased rapidly. After 30 minutes of immersion, the rate of increase decreases gradually and, after 120 minutes, the initial coulombic efficiency is maintained without further increase. The open-circuit voltage (OCV) of a cell shows an opposite tendency to the initial coulombic efficiency. Therefore, the above-described range is recommended because it is difficult to expect improved performance of the anode through prelithiation when the immersion time is shorter than 0.01 minute and no more improvement in initial coulombic efficiency, decrease of OCV, etc. can be expected when the immersion time exceeds 1440 minutes.

In the step (b), a molar ratio of the anode active material to the complex of the lithium ion and the aromatic hydrocarbon derivative may be 1:0.1 to 1:10, specifically 1:1 to 1:5, more specifically 1:2 to 1:3. The prepared anode could be prelithiated satisfactorily when the molar ratio was 1:0.1 to 1:10, and the most ideal initial coulombic efficiency could be achieved when the molar ratio was 1:1 to 1:5.

The step (b) may be performed continuously by a roll-to-roll process. FIG. 4F illustrates the roll-to-roll process. More specifically, the roll-to-roll process is performed by a roll-to-roll apparatus, and the roll-to-roll apparatus includes an unwinder and a rewinder. The unwinder continuously unwinds the anode, and the rewinder continuously winds the anode after the roll-to-roll process is finished. The unwinder and the rewinder confer tension to the anode for a lithium secondary battery. The anode is supplied continuously by the unwinder and the rewinder. The supplied anode passes through a prelithiation solution accommodation unit which accommodates the prelithiation solution. The anode is prelithiated by being immersed in the prelithiation solution accommodated by the accommodation unit. The anode that has passed through the prelithiation solution accommodation unit is wound by the rewinder. The immersion time in the prelithiation solution may be controlled by controlling the speed of the roll-to-roll process or by changing the number, location, etc. of the rolls. The prelithiated anode may pass through an additional solution accommodation unit for washing and may pass through a drier for removal of the remaining solution. The prelithiation solution used in the preparation method the present disclosure is advantageous in that it is applicable to a roll-to-roll process allowing large-scale production because a protective layer is formed on the anode surface and, thus, stability can be maintained for a long time in dry air.

Another aspect of the present disclosure provides a prelithiated anode using prelithiation solution described above.

Another aspect of the present disclosure provides a lithium secondary battery comprising: (a) prelithiated anode described above, (b) cathode, and (c) electrolyte.

Another aspect of the present disclosure provides a lithium-ion capacitor comprising: (a) prelithiated anode described above, (b) cathode, and (c) electrolyte.

Hereinafter, the present disclosure will be described in more detail through examples. However, the following examples are for the purpose of illustrating the present disclosure in more detail. It will be obvious to those of ordinary skill in the art that the present disclosure is not limited to the examples and various changes and modifications can be made within the scope and technical idea of the present disclosure.

EXAMPLES

Electrochemical Analysis

For fabrication of an electrode, an aqueous slurry was prepared by mixing $SiO_x$ (Hansol Chemical, Korea), carbon black (Super-P, Timcal, Switzerland) and a binder (AST-9005, Aekyung Chemical Co., Ltd. Korea) with a weight ratio of 5:3:2 using a centrifugal mixer (THINKY Corporation, Japan). After casting the slurry on a Cu foil current collector, the electrode was dried at 80° C. for 1 hour, roll-pressed, cut into a diameter of 11.3 mm (area: 1.003 $cm^2$), and then dried in a vacuum oven at 120 QC overnight. The loading amount of the active material on each electrode was 0.6±0.05 $mg/cm^2$. A 100 nm-sized silicon anode was composed of 100-nm Si, carbon black (Super P) and a binder with a weight ratio of 70:18:12. A CR2032 coin cell was assembled in an argon-filled glove box using PP/PE/PP as a separator and 1 M $LiPF_6$ in a mixture of ethylene carbonate (EC) and diethyl carbonate (DEC) (1:1 v/v) as an electrolyte.

Electrochemical analysis was carried out using a WBCS-3000 battery cycler (Wonatech Co. Ltd., Korea) and a VMP3 potentio/galvanostat (Bio-logic Scientific Instruments, France). All the electrochemical measurements were performed at 30° C.

For half-cell experiments, the coin cell was discharged with a constant current (30 mV vs Li), followed by a constant voltage until the current density decayed to 10% of the constant-current current density, and then recharged to 1.2 V. The current densities for the constant-current steps were 300 mA/g, 600 mA/g and 1500 mA/g for the first cycle, the second cycle and the subsequent cycles, respectively.

For full-cell experiments, a cathode was fabricated by casting a slurry composed of Li(Ni$_{1/3}$CO$_{1/3}$Mn$_{1/3}$)O$_2$ (NCM111) or Li(Ni$_{0.5}$Co$_{0.2}$Mn$_{0.3}$)O$_2$ (NCM523) (Wellcos Corporation, Korea), Super P and a polyvinylidene fluoride (PvdF) binder at a weight ratio of 84:8:8 in a N-methyl-2-pyrrolidone (NMP) solvent on a carbon-coated aluminum foil. The diameters of the cathode and the anode were 11.3 mm and 12 mm, respectively. A full cell was designed to have an N/P ratio (the practical capacity ratio of the anode to the cathode) of 1.2. A coin cell was fabricated in the same manner as the half-cell described above except for using an additional Whatman GFD separator.

Cyclic voltammograms of each aromatic hydrocarbon (or aromatic hydrocarbon derivative) compound were recorded at a scan rate of 50 mV/s at designated temperatures using a copper foil (working electrode), lithium metal (counter electrode) and 0.2 M redox-active hydrocarbon in a 0.5 M LiPF$_6$ DME solution as an electrolyte.

Preparation of Prelithiation Solution

Prelithiation solutions including lithium-aromatic hydrocarbon (or aromatic hydrocarbon derivative) compound complexes were prepared by dissolving lithium metal slice in a dimethoxyethane solution containing 0.5 M of different aromatic hydrocarbon (or aromatic hydrocarbon derivative) compounds by stirring for 1 hour at 30° C. in an argon-filled glove box. The molar ratio of lithium:aromatic hydrocarbon (or aromatic hydrocarbon derivative) compound was fixed to 4:1 to supply an enough amount of lithium. The used aromatic hydrocarbon (or aromatic hydrocarbon derivative) compounds were as follows:

naphthalene (NP), biphenyl (BP), 3,3'-dimethylbiphenyl (3,3'-DMBP), 2-methylbiphenyl (2-MBP), 4,4'-dimethylbiphenyl (4,4'-DMBP), 3,3'4,4'-tetramethylbiphenyl (3,3',4,4'-TMBP).

Preparation of Prelithiated Silicon Anode

A SiO$_x$ anode was immersed in the prelithiation solution for a controlled duration and temperature. Then, a prelithiated anode was prepared by quenching the anode with 1 M LiPF$_6$ EC/DEC (1:1 v/v) electrolyte to quench further reaction between the prelithiation solution and the anode. The molar ratio of the lithium-aromatic hydrocarbon (or aromatic hydrocarbon derivative) complex and SiO$_x$ in the prelithiation solution was fixed to 6:1.

Test Example 1. Analysis of Prelithiation

FIG. 1A shows a cyclic voltammetry analysis result of naphthalene, biphenyl and methyl-substituted biphenyl used for the preparation of the prelithiation solution. As seen from FIG. 1A, the cyclic voltammograms of the aromatic hydrocarbon compounds used for the prelithiation solution show that the biphenyl derivatives substituted with functional groups have lower redox potentials as compared to biphenyl. In addition, it was clear that naphthalene with a redox potential of 0.37 V was not suitable for lithiating SiO$_x$.

In addition, it was found that the degree of redox potential shift depends on the position of the substituent. Substitution of one methyl group at the ortho position caused a larger potential shift ($E_{1/2}$=131 mV, 2-MBP) than addition of two methyl groups at the meta position ($E_{1/2}$=294 mV, 3,3'-DMBP) or addition of two methyl groups at the para position ($E_{1/2}$=186 mV for 4,4'-DMBP). The substitution of four methyl groups at both the meta and para positions (3,3',4,4'-TMBP) reduced the redox potential to 129 mV, which was similar to that of 2-MBP.

The addition of two methyl groups at the ortho position (2,2'-DMBP) lowered the reduction potential below 0 V vs Li/Li$^+$, which led to the stabilization of lithium metal in the 2,2'-DMBP prelithiation solution.

The negative shift in the reduction potential is linked to the elevation of the frontier molecular orbital energy level as a result of substitution of chemical functional groups.

Figure 1B:
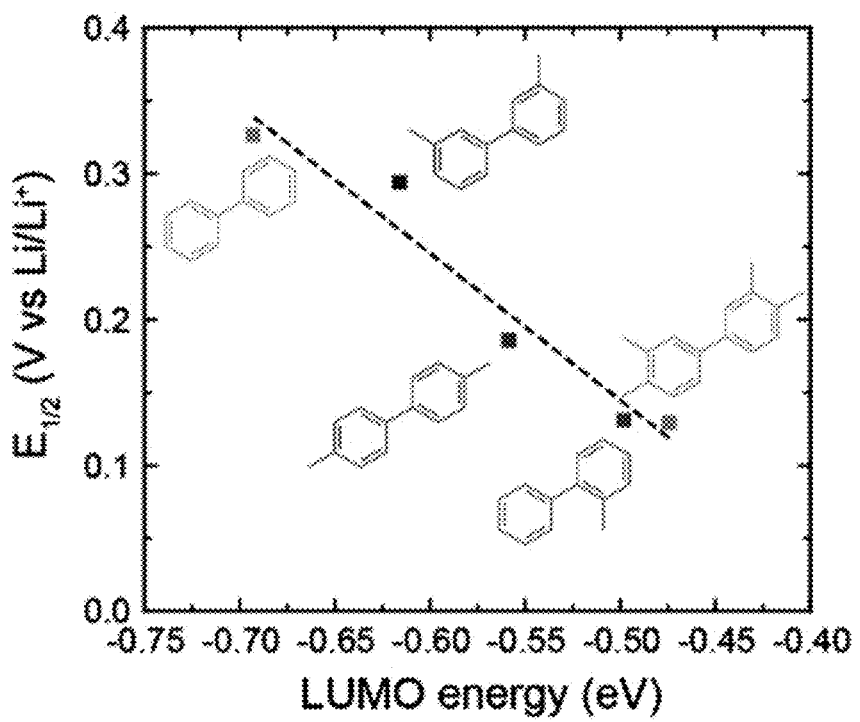
FIG. 1B shows the correlation between the calculated LUMO energy level and the reduction potential ($E_{1/2}$) of aromatic hydrocarbon compounds used for preparation of a prelithiation solution according to an exemplary embodiment of the present disclosure.

FIG. 1B shows the correlation between the calculated LUMO energy and the redox potential ($E_{1/2}$). As seen from FIG. 1B, the LUMO (lowest unoccupied molecular orbital) energy levels of the substituted biphenyl derivatives obtained by the density functional theory (DFT) calculations correlated linearly with the experimentally observed redox potentials with a slope of $-1.01$ V eV$^{-1}$. With a LUMO energy of $-0.11$ eV for 2,2'-DMBP, a redox potential of $-0.25$ V vs Li/Li$^+$ was estimated based on extrapolation, which confirmed that the complex is less stable than lithium metal.

Figure 1C:
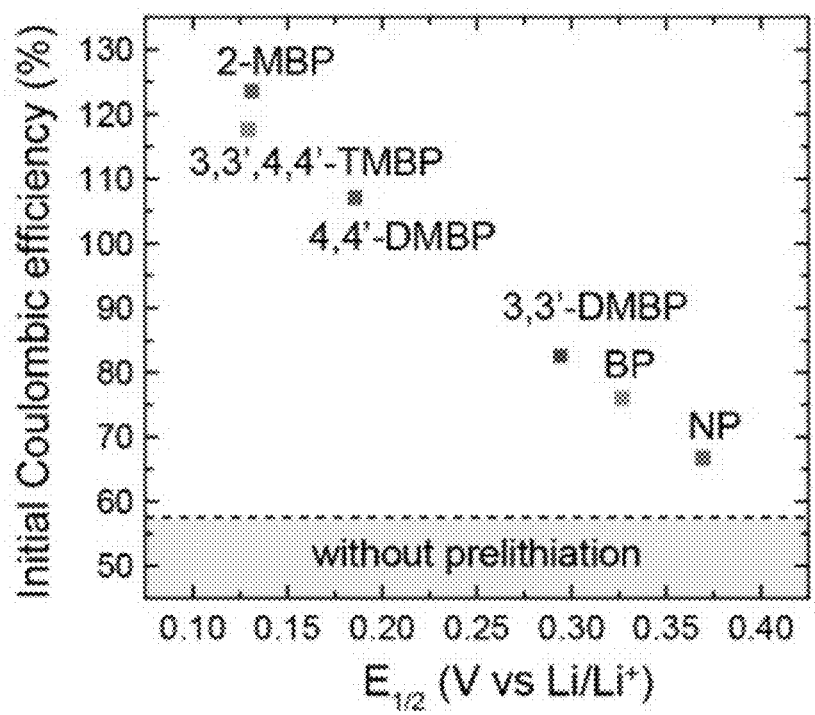
FIG. 1C shows the correlation between the initial coulombic efficiency and redox potential ($E_{1/2}$) of aromatic hydrocarbon compounds used for preparation of a prelithiation solution according to an exemplary embodiment of the present disclosure.
Figure 1D:
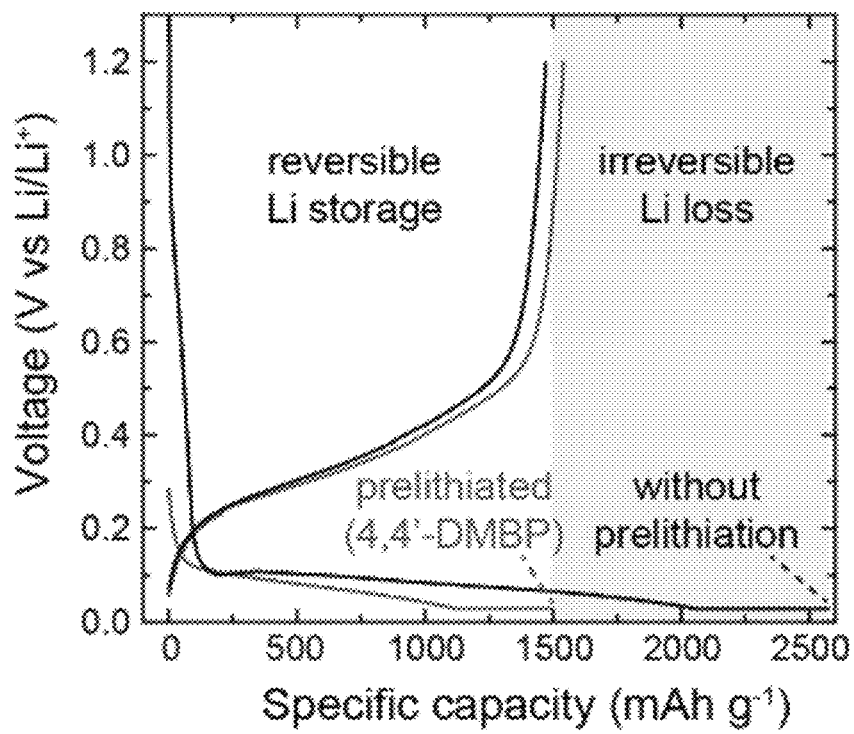
FIG. 1D shows voltage profiles of an initial charge-discharge cycle of a prelithiated $SiO_x$ anode and a pristine $SiO_x$ electrode prepared according to an exemplary embodiment of the present disclosure.

FIG. 1C shows the correlation between the redox potential and initial coulombic efficiency of the prepared electrodes. The functionally substituted biphenyl derivatives with reduction potentials lower than 0.2 V, i.e., 4,4'-DMBP, 2-MBP and 3,3',4,4'-TMBP, led to initial coulombic efficiencies exceeding 100%, i.e., 107%, 124% and 118%, respectively, whereas other electrodes with higher reduction potentials led to limited improvements. The initial coulombic efficiency of the functionally substituted biphenyl derivatives increased proportionally with the decrease in $E_{1/2}$, which verifies that the degree of prelithiation can be changed by varying the molecular structure of the lithium-aromatic hydrocarbon compound complexes. Also, as shown in FIG. 1D, 4,4'-DMBP, having an $E_{1/2}$ of 0.19 V, successfully compensated for the irreversible lithium loss during the initial discharge of the prelithiated SiO$_x$ anode, which exhibited a discharge capacity of 1483 mAh/g equivalent to the charge capacity. FIG. 1D shows the voltage profiles of initial charge-discharge cycles of the SiO$_x$ anode prelithiated by 4,4'-DMBP and the pristine SiO$_x$ electrode.

Figure 1E:
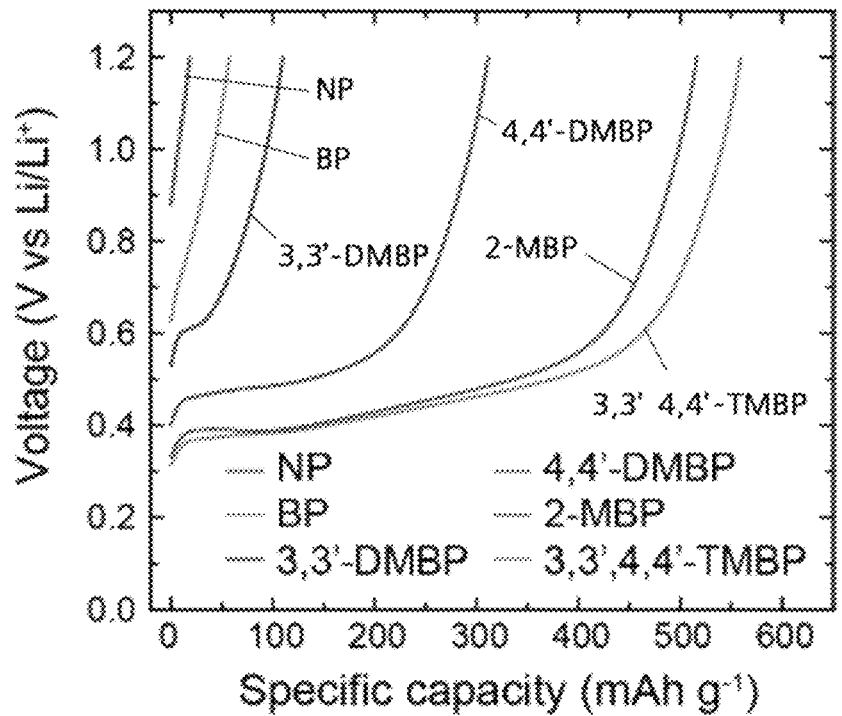
FIG. 1E shows a result of electrochemical titration of active lithium ions stored in $SiO_x$ electrodes after prelithiation.

In order to determine the active lithium content in SiO$_x$ after prelithiation, delithiation capacity was measured by directly charging the prelithiated SiO$_x$||Li cell (FIG. 1E). FIG. 1E shows a result of electrochemical titration of active lithium ions stored in the SiO$_x$ electrodes after prelithiation. As shown in FIG. 1E, the charge capacities of the electrodes immersed in the 4,4'-DMBP, 2-MBP and 3,3',4,4'-TMBP prelithiation solutions were 312 mAh g$^{-1}$, 518 mAh g$^{-1}$ and 560 mAh g$^{-1}$, respectively, which are equivalent to 21-37% of the reversible capacity of SiO$_x$. In contrast, the NP-, BP- and 3,3'-DMBP-prelithiated electrodes showed negligible charge capacities due to their insufficient reducing strength to add lithium to SiO$_x$. Therefore, the improved initial coulombic efficiency observed in FIG. 1C after treating with the NP, BP and 3,3'-DMBP prelithiation solutions is attributed to the suppressed parasitic reaction due to the SEI layer formed on the SiO$_x$ surface. This result supports that a lithium-aromatic hydrocarbon derivative complex containing a functionally substituted aromatic hydrocarbon compound is necessary for accommodation of active lithium in SiO$_x$ to achieve the ideal coulombic efficiency as opposed to SEI preformation with the lithium-aromatic hydrocarbon compound complex having limited reducing strength.

Test Example 2. Control of Prelithiation Temperature and Time

Prelithiated electrodes were prepared using the 4,4'-DMBP prelithiation solution while controlling the temperature and time of the prelithiation reaction.

Figure 2A:
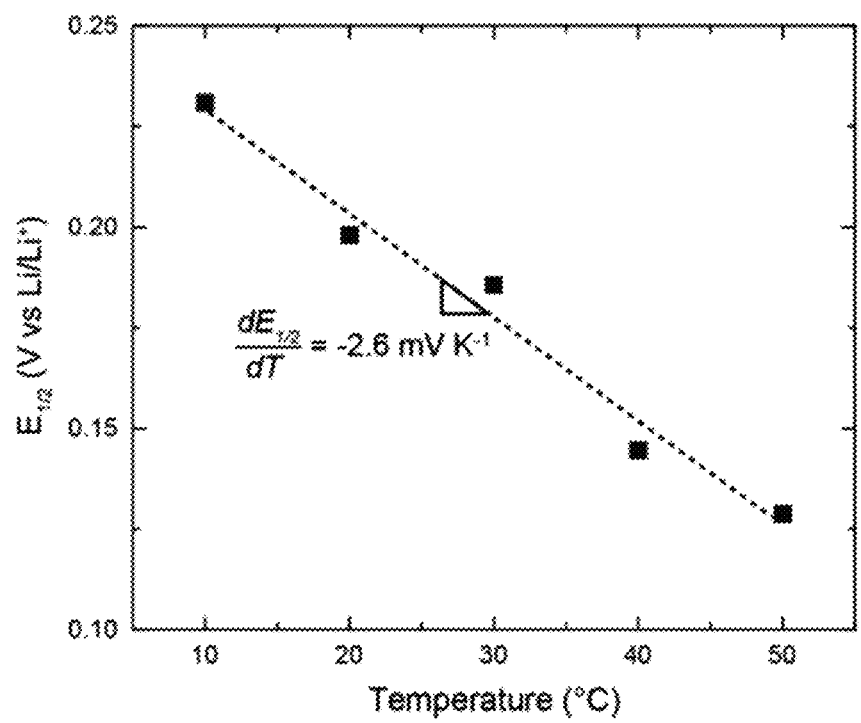
FIG. 2A shows the relationship between the redox potential of 4,4'-DMBP and temperature.
Figure 2B:
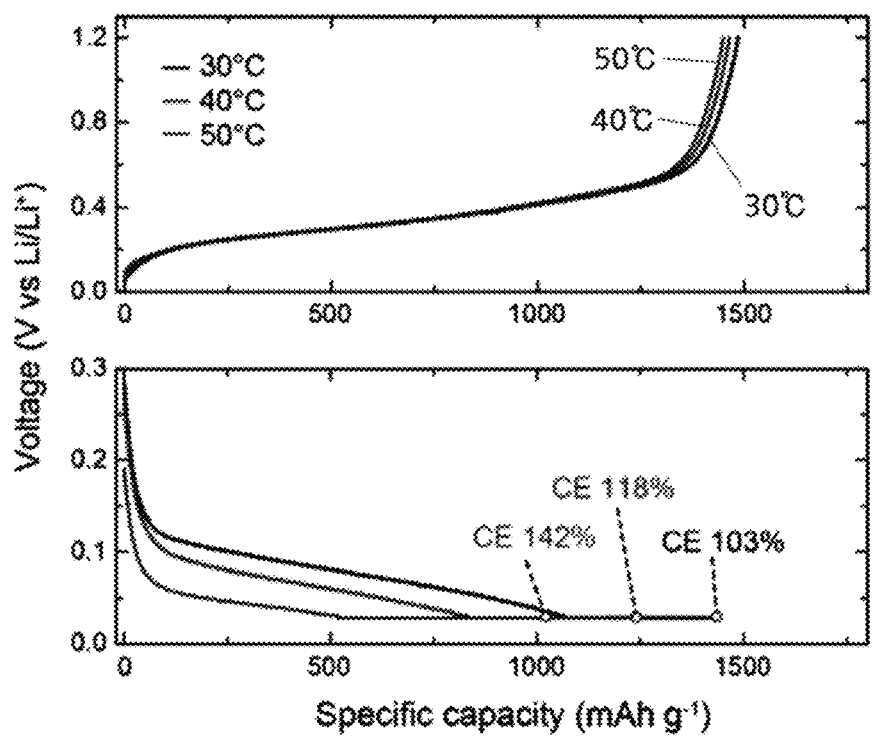
FIG. 2B shows the initial voltage profiles of $SiO_x$ anodes prepared at different prelithiation temperatures according to an exemplary embodiment of the present disclosure.

First, the temperature coefficient ($\alpha=dE_{1/2}/dT$) of the 4,4'-DMBP prelithiation solution was measured by performing cyclic voltammetry. The reducing strength of the 4,4'-DMBP prelithiation solution was controlled thermodynamically by changing temperature. FIG. 2A shows the relationship between the redox potential of 4,4'-DMBP and temperature. As shown in FIG. 2A, the $E_{1/2}$ of the 4,4'-DMBP prelithiation solution shifted linearly from 231 mV to 129 mV as the temperature was increased from 10° C. to 50° C., with a slope of −2.6 mV K$^{-1}$. The entropy and enthalpy changes in the redox reaction were calculated to be −248.9 Jmol$^{-1}$K$^{-1}$ and −92.5 KJmol$^{-1}$, respectively. Thus, the prelithiation solution does not theoretically precipitate lithium metal below 95.7° C., the temperature at which the $E_{1/2}$ value reaches 0 V (vs Li/Li$^+$). As a result of the reducing strength being enhanced on increasing the temperature from 30° C. to 50° C., the initial coulombic efficiency of the prelithiated SiO$_x$ increased from 103% to 142%, as shown in FIG. 2B. FIG. 2B shows the initial voltage profiles of the SiO$_x$ anodes prepared at different prelithiation temperatures.

Figure 2C:
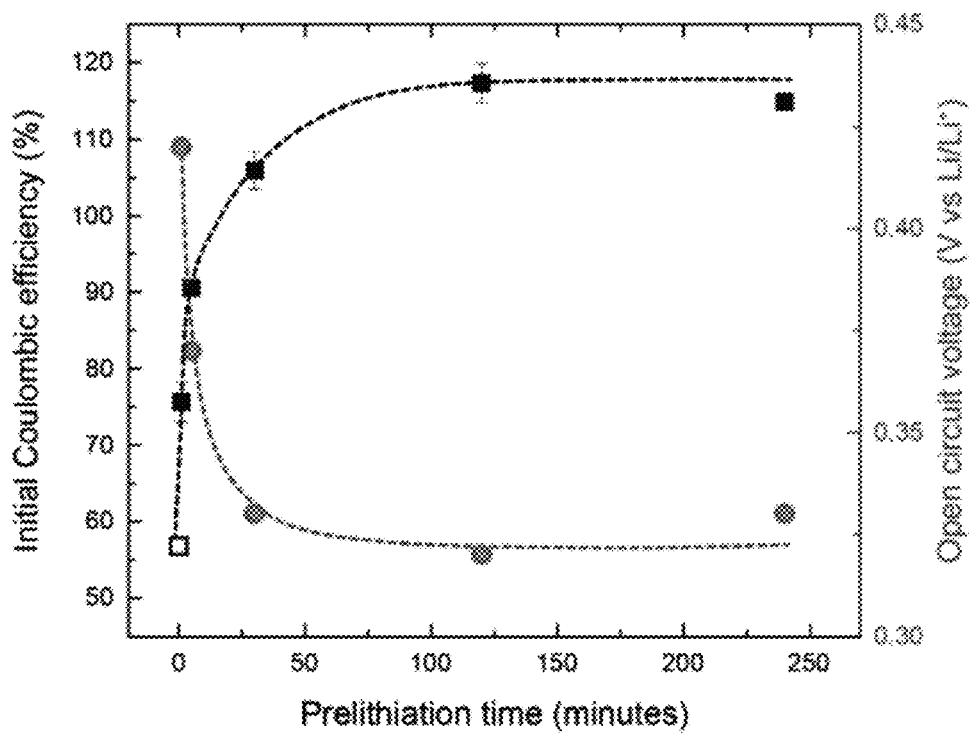
FIG. 2C shows a result of measuring the initial coulombic efficiency and open-circuit voltage (OCV) of $SiO_x$ electrodes prepared by varying prelithiation time according to an exemplary embodiment of the present disclosure.
Figure 2D:
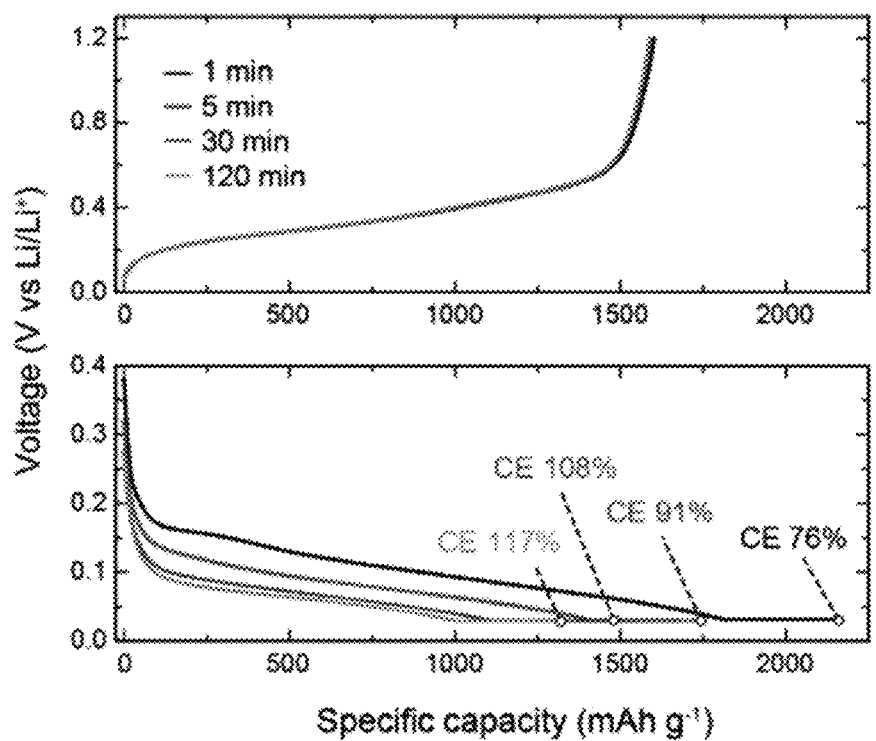
FIG. 2D shows the initial voltage profiles of $SiO_x$ electrodes prepared by varying immersion time in a prelithiation solution according to an exemplary embodiment of the present disclosure.

FIG. 2C and FIG. 2D show a result of measuring the initial coulombic efficiency, open-circuit voltage and voltage profiles by varying prelithiation time. The immersion time also exerted a profound effect on the prelithiation degree of the SiO$_x$ electrode. The lithiation reaction occurred within a few minutes and the initial coulombic efficiency of the SiO$_x$ electrode was improved remarkably. After 5 minutes of immersion, the initial coulombic efficiency increased from 57% to 91%, a value that is comparable to that of commercial anodes. After 30 minutes, when the initial coulombic efficiency reached 100%, the prelithiation reaction slowed down and then nearly reached equilibrium after 2 hours.

Given these results, it can be seen that precise control of the prelithiation degree can be readily realized at the industrial scale by adjusting the prelithiation temperature and time.

The open-circuit voltage (OCV) of a SiO$_x$||Li cell was measured immediately after cell assembly in order to predict the prelithiation degree prior to cycling. The result is shown in FIG. 2C. The OCV only varied less than 20 mV during 10 hours of prelithiation reaction. This means that lithium is accommodated homogeneously in SiO$_x$ during the solution-based prelithiation.

Figure 3A:
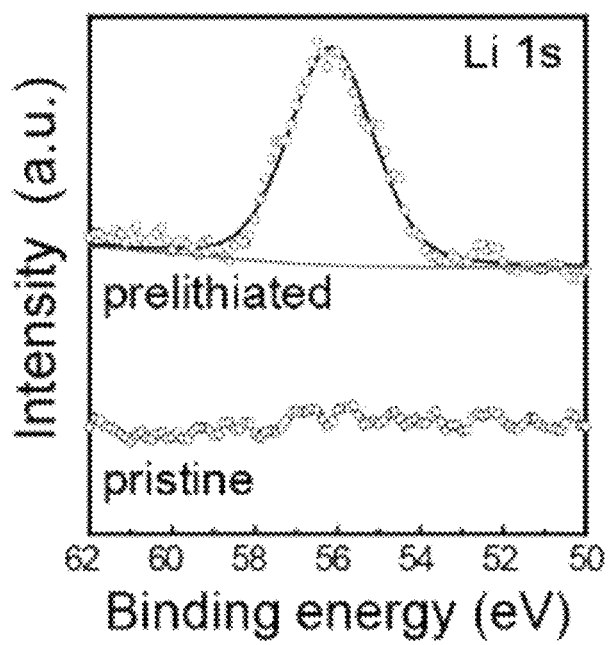
FIG. 3A shows the Li 1s XPS spectra of a pristine $SiO_x$ electrode and a prelithiated $SiO_x$ electrode according to an exemplary embodiment of the present disclosure.
Figure 3B:
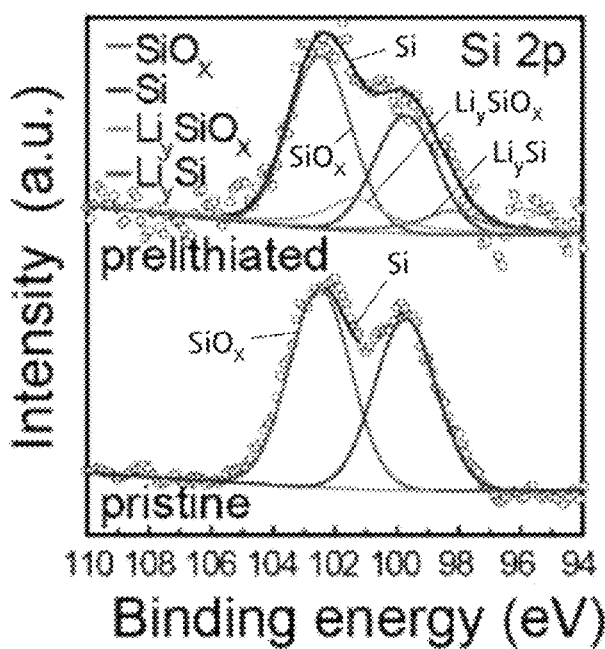
FIG. 3B shows the Si 2p spectra of a pristine $SiO_x$ electrode and a prelithiated $SiO_x$ electrode according to an exemplary embodiment of the present disclosure.

Test Example 3. Chemical and Microstructural Change of SiO$_x$ Electrode During Prelithiation Reaction Analysis of Chemical Change The chemical change of SiO$_x$ during the prelithiation reaction was analyzed by X-ray photoelectron spectroscopy (XPS). FIG. 3A shows the Li 1s XPS spectra of a pristine electrode and a prelithiated electrode. In FIG. 3A, the prelithiated electrode shows a distinct peak at 56 eV, which is attributable to the Li dopants existing in Li$_y$SiO$_x$/Li$_z$Si and the Li components in the preformed SEI layer. In the Si 2p spectra of FIG. 3B, the pristine SiO$_x$ exhibits peaks at 99.5 eV and 103 eV, corresponding to Si and SiO$_x$, respectively. After the prelithiation, additional peaks were observed at 98.5 eV and 101.8 eV, which are attributable to prelithiated Si and SiO$_x$, respectively.

Figure 3C:
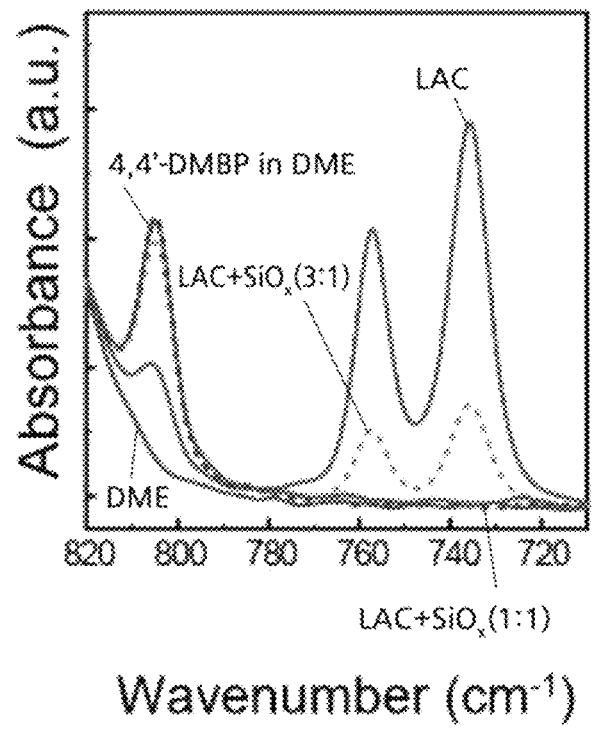
FIG. 3C shows the FT-IR spectra of DME, 4,4'-DMBP, Li-4,4'-DMBP (LAC) and the LAC after reaction with $SiO_x$ electrodes with different loadings (Li:Si=3:1 and 1:1).

Further, the chemical state of the lithium-aromatic hydrocarbon derivative compound complex solution before and after immersion of the SiO$_x$ anode was analyzed. The dominant chemical species present in the lithium-aromatic hydrocarbon derivative compound complex solution at room temperature was likely the radical ions of the functionally substituted biphenyl derivative, and it was expected that the Li$^+$-[4,4'-DMBP]$^-$ complex transfers an electron and a lithium ion to the SiO$_x$ electrode and is reoxidized to form neutral 4,4'-DMBP during prelithiation. To verify this hypothesis, the FT-IR spectra of the 4,4'-DMBP solution, the Li$^+$-[4,4'-DMBP]$^-$ complex solution and the complex solution obtained after immersing the SiO$_x$ electrode were compared (FIG. 3C). FIG. 3C shows the FT-IR spectra of DME, 4,4'-DMBP and Li-4,4'-DMBP (LAC) after reaction with the SiO$_x$ electrodes with different loadings (Li:Si=3:1 and 1:1). It was clearly observed from the FT-IR spectra that the 4,4'-DMBP was first reduced and then reoxidized when reacted with lithium metal and the SiO$_x$ electrode successfully (the characteristic peaks of 4,4'-DMBP at 806 disappeared after the addition of lithium and then reappeared after the reaction with SiO$_x$). These results confirm the reversible redox process of 4,4'-DMBP and thus demonstrates the reusability of the prelithiation reaction of the lithium-aromatic hydrocarbon derivative compound complex.

Figure 3D:
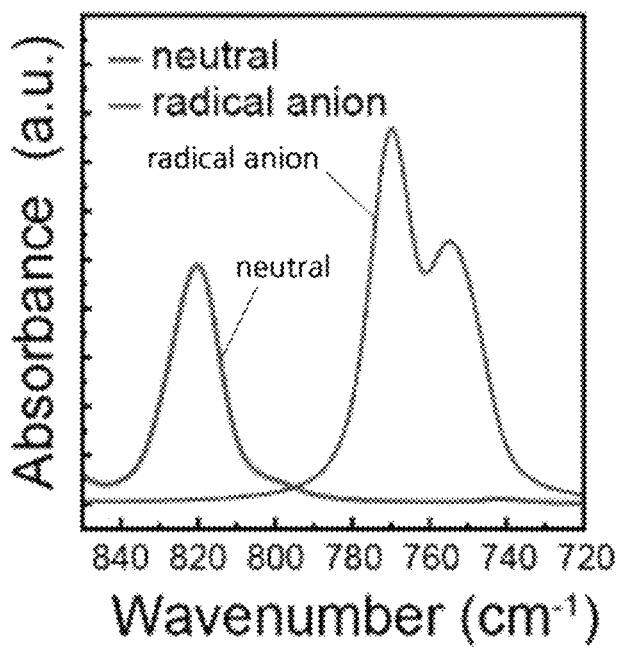
FIG. 3D shows the simulated FT-IR spectra obtained for 4,4'-DMBP in neutral and radical anion forms through DFT calculation of expected vibrational frequency.

FIG. 3D shows the simulated FT-IR spectra obtained for 4,4'-DMBP in neutral and radical anion forms through DFT calculation of expected vibrational frequency. The peaks at 806 and 1502 cm$^{-1}$ correspond to C—H out-of-plane bending and C—C stretching of the benzene ring in 4,4'-DMBP, respectively. The new peaks at 737, 758 and 1580 cm$^{-1}$ correspond to in-plane C—C bending, out-of-plane C—C bending and C—C stretching of the benzene ring, respectively. The spectrum of the Li-4,4'-DMBP complex agreed well with the calculated vibrational frequency for the radical anion. The DFT calculation result verified the reversible evolution of phenyl in 4,4'-DMBP during complex formation and subsequent prelithiation.

Figure 3E:
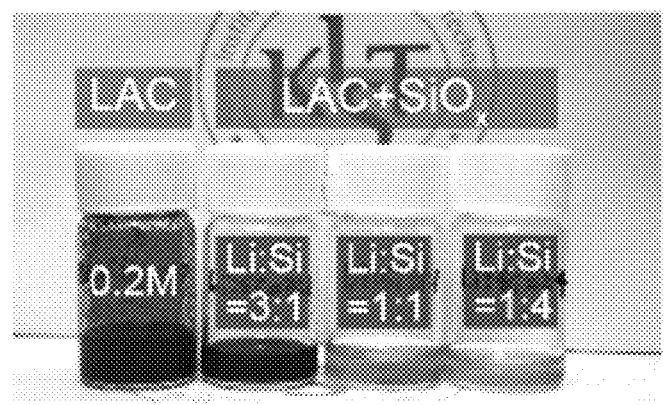
FIG. 3E shows the photographs of a lithium-aromatic hydrocarbon derivative complex solution used in FIG. 3C.

When the lithium-aromatic hydrocarbon derivative compound complex was reacted with ⅓ molar equivalent of SiO$_x$, mixed characteristics of the Li-4,4'-DMBP complex solution and the 4,4'-DMBP solution were observed, indicating the presence of both neutral and anionic forms of 4,4'-DMBP. In contrast, when reacted with equimolar SiO$_x$, the spectra were completely identical to those of the 4,4'-DMBP solution, suggesting that the prelithiation had completely oxidized the lithium-aromatic hydrocarbon derivative compound complex. The prelithiated SiO$_x$ anode from this case exhibited partial improvement in the initial coulombic efficiency, indicating that the amount of the lithium-aromatic hydrocarbon derivative compound complex was insufficient to achieve an ideal initial coulombic efficiency. From the linear relationship between the initial coulombic efficiency and the molar ratio of lithium-aromatic hydrocarbon derivative compound complex:SiO$_x$, it was confirmed that 2.5 molar equivalents of the lithium-aromatic hydrocarbon derivative compound complex would be ideal for the electrode. As shown in FIG. 3E, it was also observed that the color of the lithium-aromatic hydrocarbon derivative compound solution changed from blue to green after being reacted with more than equimolar SiO$_x$.

Analysis of Microstructural Change

Figure 3F:
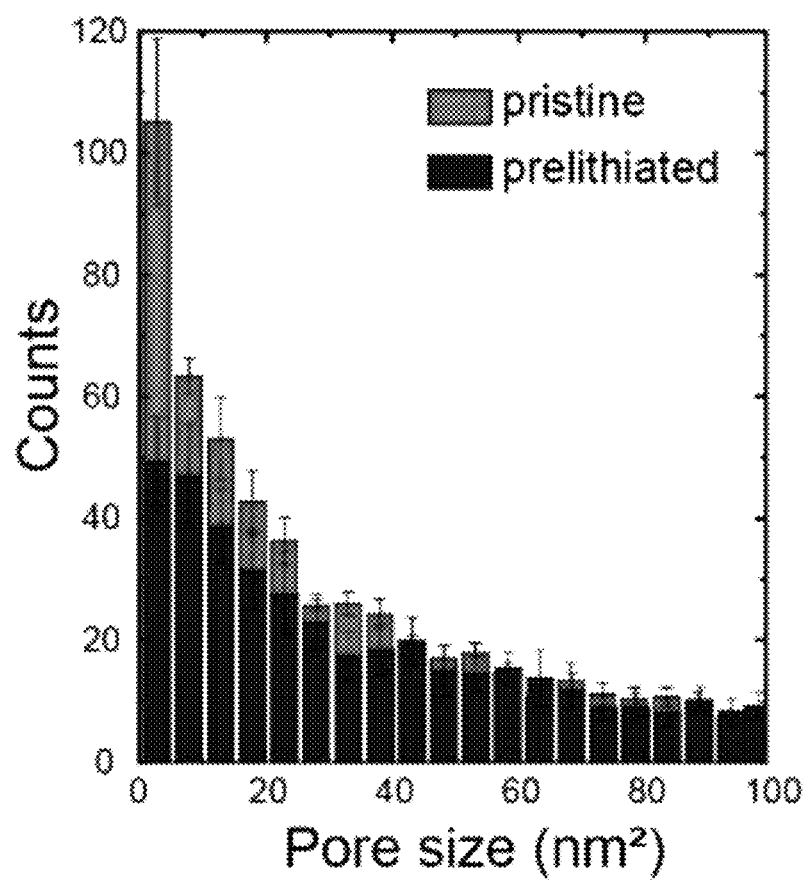
FIG. 3F shows the histogram of pore size distribution in a prelithiated electrode according to an exemplary embodiment of the present disclosure.
Figure 3G:
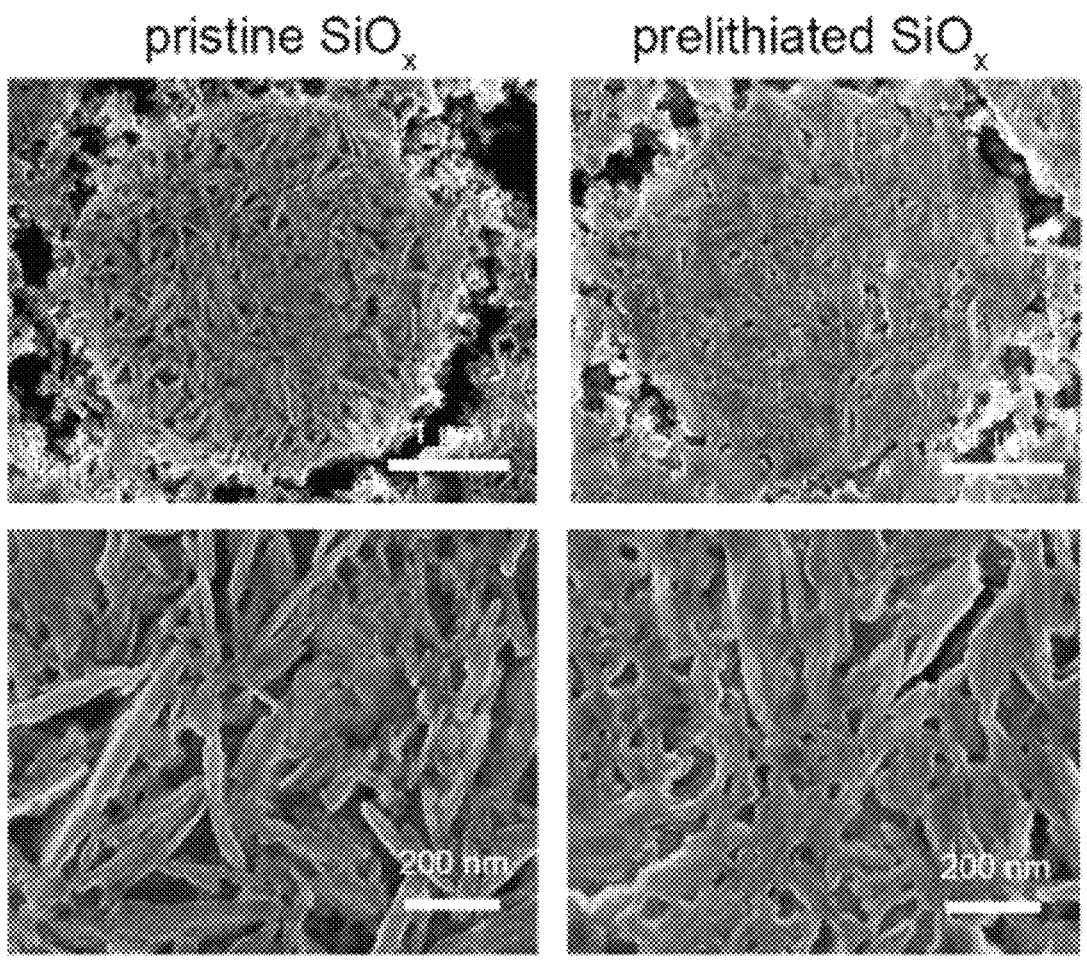
FIG. 3G shows the cross-sectional SEM images of a pristine $SiO_x$ anode and a prelithiated $SiO_x$ anode according to an exemplary embodiment of the present disclosure.
Figure 3H:
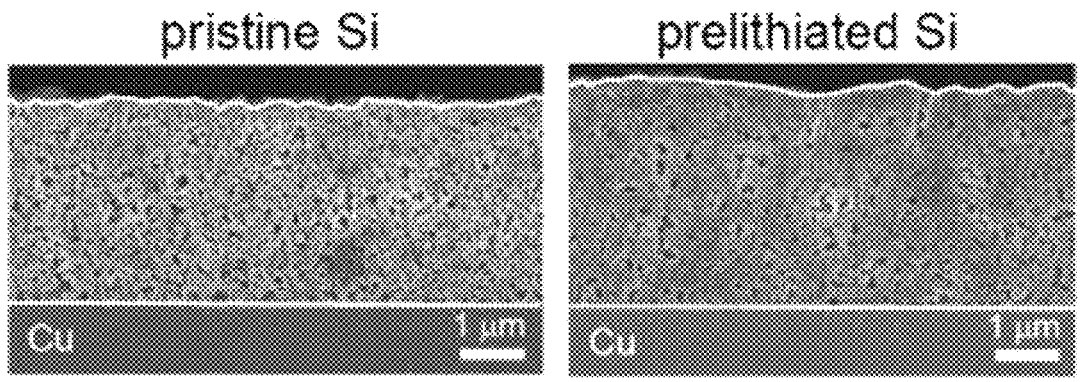
FIG. 3H shows the cross-sectional SEM images of a pristine Si anode and a prelithiated Si anode comprising Si particles with a size of 100 nm.

FIG. 3G shows the cross-sectional SEM images of a pristine SiO$_x$ anode and a prelithiated SiO$_x$ anode according to an exemplary embodiment of the present disclosure, and FIG. 3H shows the cross-sectional SEM images of a pristine Si anode and a prelithiated Si anode including Si particles with a size of 100 nm. As a consequence of the chemical lithiation of SiO$_x$, the volume of the active particles expanded, which in turn filled the pre-existing pores, as observed in the SEM images of FIG. 3G. The distinctive features of SiO$_x$ nanoflakes disappeared as the particles merged with other neighboring particles. The area fraction of the pores, which was 20.1%, observed within the designated areas decreased significantly to 11.1% after prelithiation. As shown in the histogram of FIG. 3F, the reduced porosity was mainly due to the lower number of small pores. The shrinkage of pores was also observed for the electrode containing 100 nm-sized Si particles, as shown in FIG. 3H, which expanded homogeneously throughout the electrode. At the same time, the thickness of the electrode increased by 7.8% as a result of the prelithiation.

A benefit of using solution-based prelithiation over the physical/mechanical method is spatial homogeneity of the reaction. The 100 nm-sized silicon particles evenly expanded after the lithiation, indicating spatially uniform prelithiation. To confirm the effective penetration of the lithium-aromatic hydrocarbon derivative compound solution, the prelithiation of a thick $SiO_x$ electrode with a large areal capacity (2.46 mAh $cm^{-2}$) was investigated, and an initial coulombic efficiency of 104% was attained. Under the same condition, a thin electrode showed an initial coulombic efficiency of 108%. This means that the method of the present disclosure can mitigate the detrimental effects of inner-pressure build-up in batteries through prelithiation.

Test Example 4. Feasibility in Practical Lithium-Ion Battery Production

Full Cell Test

Benefiting from the improved initial coulombic efficiency of the $SiO_x$ anode, the energy density of a full cell including the prelithiated anode was increased.

Figure 4A:
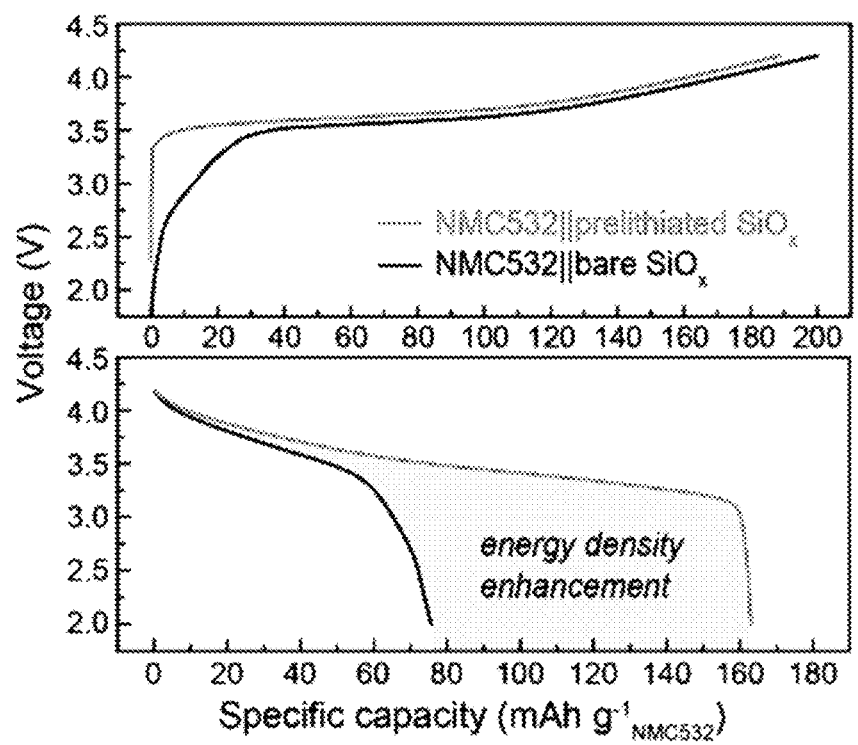
FIG. 4A shows the voltage profiles of initial electrochemical cycles of a $LiNi_{0.5}Mn_{0.3}Co_{0.2}O_2$ (NMC532)||bare $SiO_x$ full cell (NBFC) and a NMC532||prelithiated $SiO_x$ full cell (NPFC) according to an exemplary embodiment of the present disclosure.

FIG. 4A shows the voltage profiles of initial electrochemical cycles of a $LiNi_{0.5}Mn_{0.3}Co_{0.2}O_2$ (hereinafter, NMC532) ||bare $SiO_x$ full cell (hereinafter, NBFC) and a NMC532||prelithiated $SiO_x$ full cell (hereinafter, NPFC). As seen from FIG. 4A, the charge profile of NPFC exhibits a higher voltage and a lower capacity compared to those of NBFC. The discharge profile of NPFC showed a remarkable improvement in the energy density compared to that of NBFC, which is attributed to the increased reversible capacity owing to the presence of extra active lithium after the prelithiation. While NBFC exhibited a discharge capacity of 75.6 mAh $g^{-1}$ with a 37.8% of initial coulombic efficiency when cycled at 4.2-2.0 V, NPFC exhibited a discharge capacity of 163 mAh g-1 and an initial efficiency of 86.4%. In addition, as seen from FIG. 4A, the energy densities of NPFC and NBFC were 504.1 and 233.6 Wh $kg^{-1}$, respectively, showing that the prelithiation of the anode enhanced the full-cell energy density by 116%.

Figure 4B:
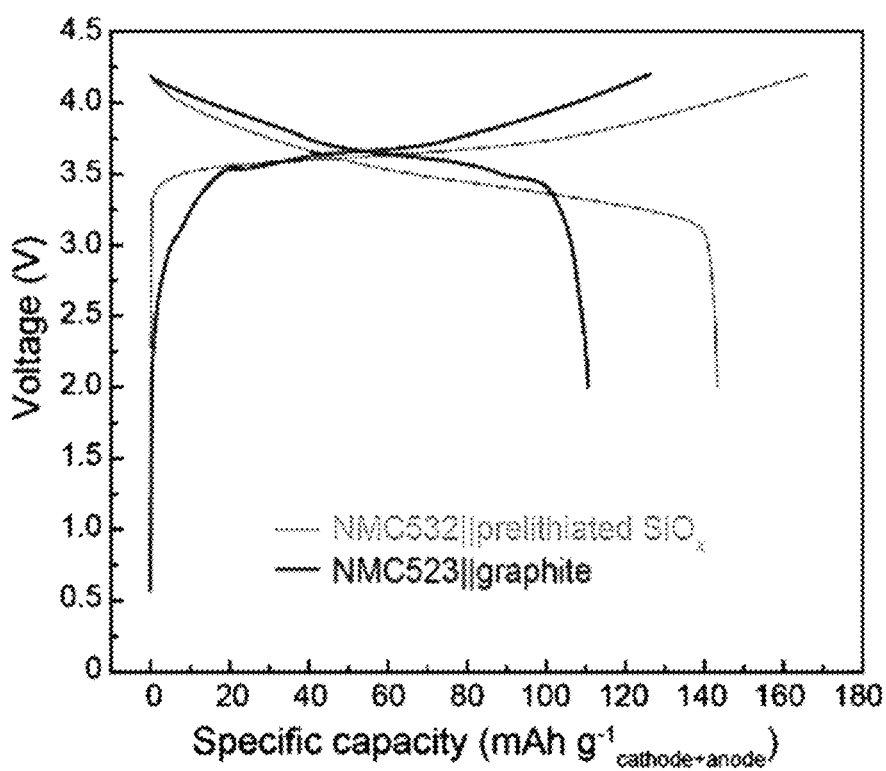
FIG. 4B shows the voltage profiles of initial cycles of a full cell having a prelithiated $SiO_x$ anode according to an exemplary embodiment of the present disclosure and a full cell including a conventional graphite anode.

FIG. 4B shows the voltage profiles of initial cycles of a full cell having a prelithiated $SiO_x$ anode and a full cell including an existing graphite anode. As seen from FIG. 4B, the full cell including the prelithiated $SiO_x$ anode showed a 98.2 Wh $kg^{-1}$ higher energy density than the full cell including the existing graphite anode.

Figure 4C:
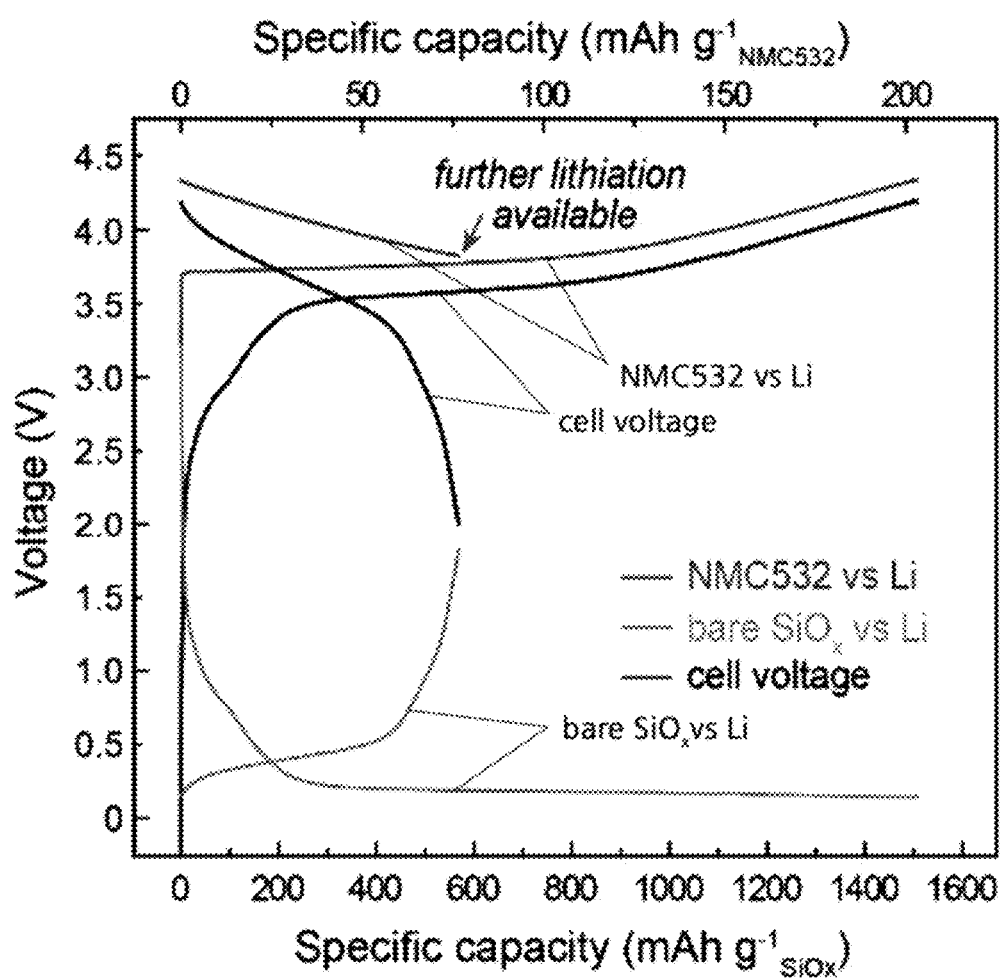
FIG. 4C shows the voltage profiles of a cathode and an anode of a NBFC according to an exemplary embodiment of the present disclosure.
Figure 4D:
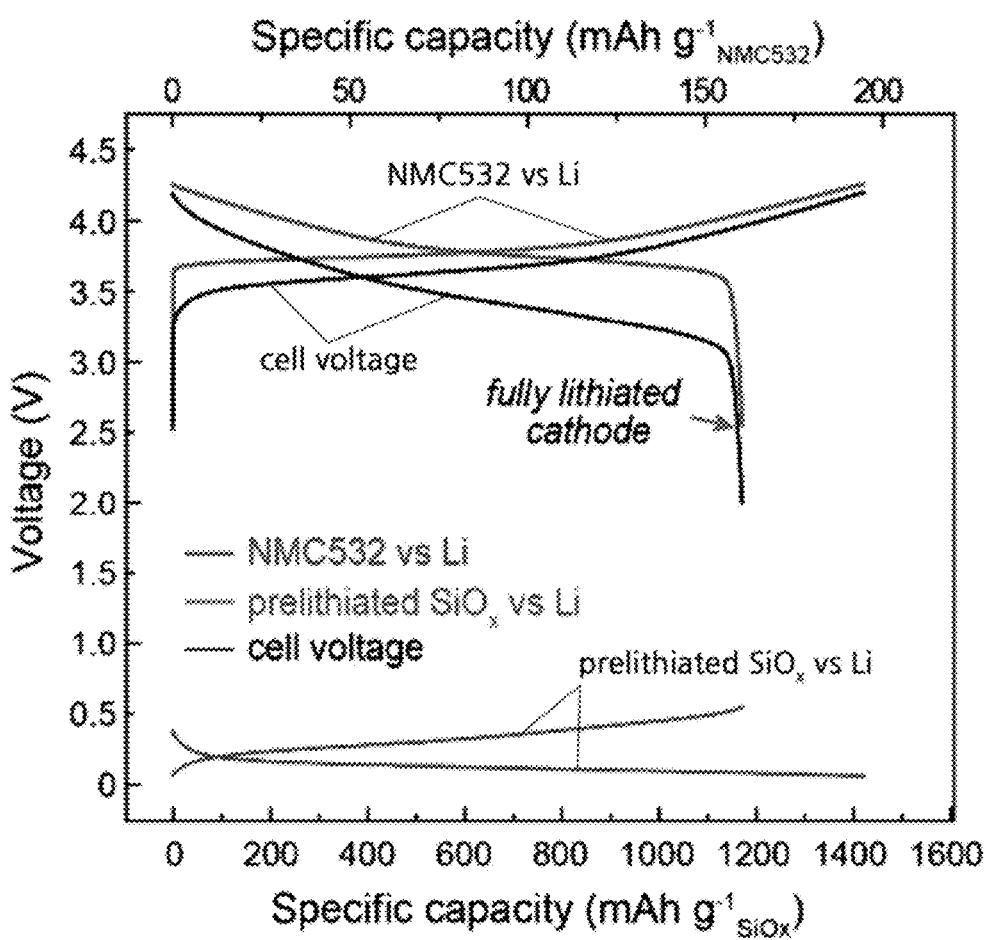
FIG. 4D shows the voltage profiles of a cathode and an anode of a NPFC.

In addition, the voltage profiles of the cathodes and anodes of NBFC and NPFC were measured using a three-electrode cell including lithium metal as a reference electrode. FIG. 4C shows the voltage profiles of the cathode and anode of NBFC, and FIG. 4D shows the voltage profiles of the cathode and anode of NPFC. As seen from FIGS. 4C and 4D, when charging NBFC, the $SiO_x$ anode initially underwent an electrochemical reaction at 0.5 V corresponding to SEI formation, which decreased the cell voltage (the potential difference between the cathode and the anode). At the end of charge, the voltage of the $SiO_x$ anode was 0.14 V in NBFC, which was higher than that in NPFC by 0.08 V. This resulted in a cathode potential of 4.34 V in NBFC at the cell voltage of 4.2 V, whereas the cathode potential was 4.26 V in NPFC. The higher cathode potential in NBFC causes delithiation of NMC532, resulting in a higher charge capacity, which causes overcharging of NMC532. During discharge, the cell voltage decayed rapidly in NBFC due to the low coulombic efficiency of $SiO_x$. When the cell voltage reached the cut-off voltage of 2.0 V, the anode potential was 1.83 V while the cathode potential was 3.83 V. As the cathode is still capable of further lithiation to 3.6 V, the result indicates that the anode limits further discharging of NBFC. In contrast, the capacity of the cathode can be fully utilized in NPFC as the anode potential remained below 0.55 V. This result elucidates the necessity of prelithiation for high-capacity anodes to boost high-energy-density lithium-ion batteries.

Evaluation of Stability Under Dry Air

The anode prelithiated according to the present disclosure showed reasonable stability under dry air atmosphere. The existing chemical prelithiation method has the problem that the prelithiated anode is unstable due to high reactivity.

Figure 4E:
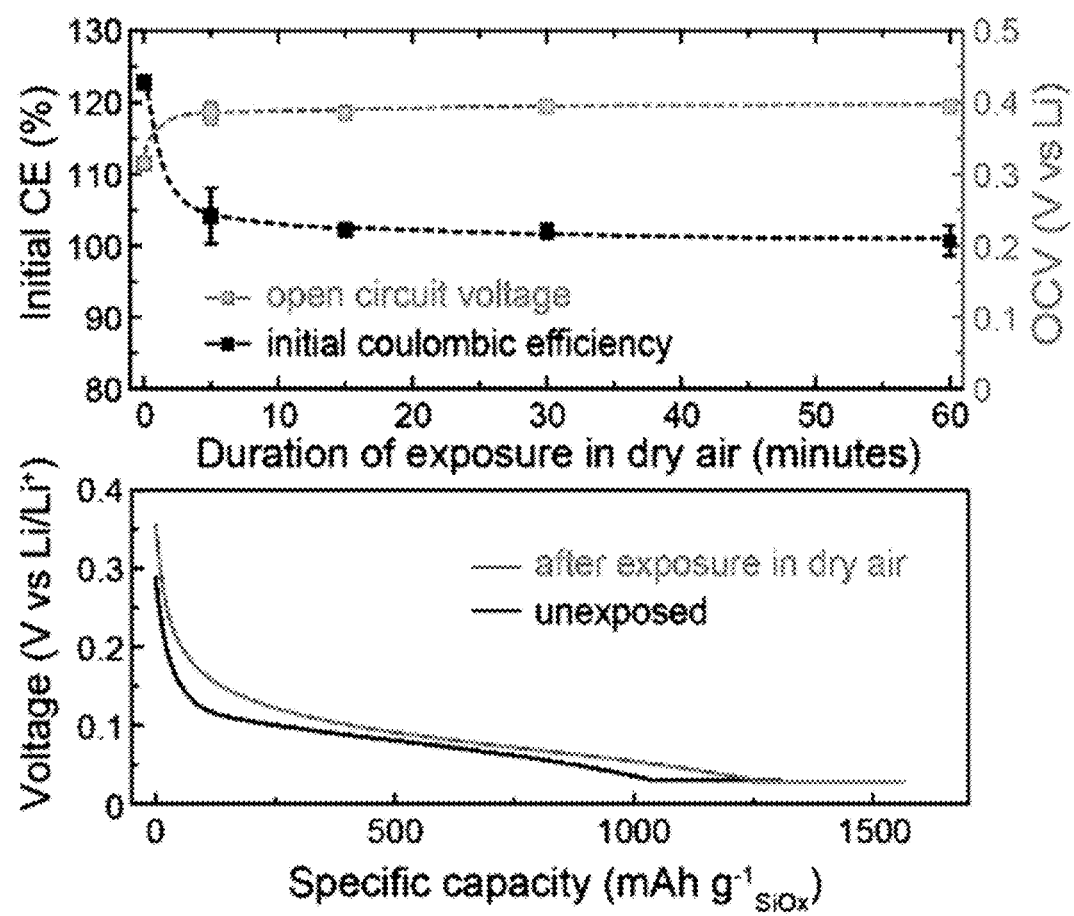
FIG. 4E shows a result of measuring the initial coulombic efficiency, OCV and voltage profile of a prelithiated $SiO_x$ anode according to an exemplary embodiment of the present disclosure depending on duration of exposure to dry air.
Figure 4F:
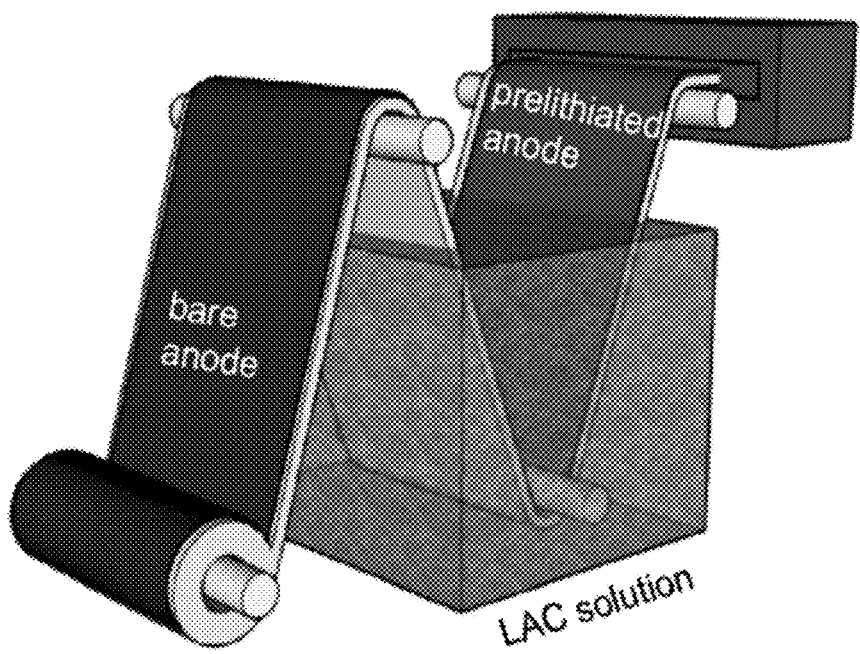
FIG. 4F illustrates a roll-to-roll process of a method for preparing a prelithiated anode according to the present disclosure.

FIG. 4E shows a result of measuring the initial coulombic efficiency, OCV and electrode profile of a prelithiated $SiO_x$ anode according to an exemplary embodiment of the present disclosure depending on duration of exposure to dry air.

Dry air stability test was proceeded in a dry room with a dew point of −86.6° C. $SiO_x$ anodes were prelithiated first at 30° C. for 90 minutes and then dried for 3 minutes in vacuum. After being exposed to dry air for 5, 15, 30 and 60 minutes, the prelithiated anodes were rinsed with an electrolyte in an argon-filled glove box.

As shown in FIG. 4E, the initial coulombic efficiency of the prelithiated anode according to the present disclosure was close to 100% even after exposure to dry air for 1 hour, and overvoltage was increased only slightly. The superior stability in dry air is due to the formation of a protective layer on the surface of the prelithiated anode. Based on the superior dry air stability, the solution-based prelithiation method of the present disclosure is readily applicable to a continuous roll-to-roll process as shown in FIG. 4F, and is applicable to large-scale production of high-energy lithium-ion batteries.

Test Example 5. Application of Other Aromatic Hydrocarbon Derivatives

In order to investigate the practicability of aromatic hydrocarbons other than biphenyl, prelithiated $SiO_x$ anodes were prepared as described above using a prelithiation solution including a complex of a lithium ion and a naphthalene derivative. The naphthalene derivatives used are as follows:

2-methylnaphthalene (2-MNP), 1,2-dimethylnaphthalene (1,2-DMNP), 1,4,6,7-tetramethylnaphthalene (1,4,6,7-TMNP)

Figure 5:
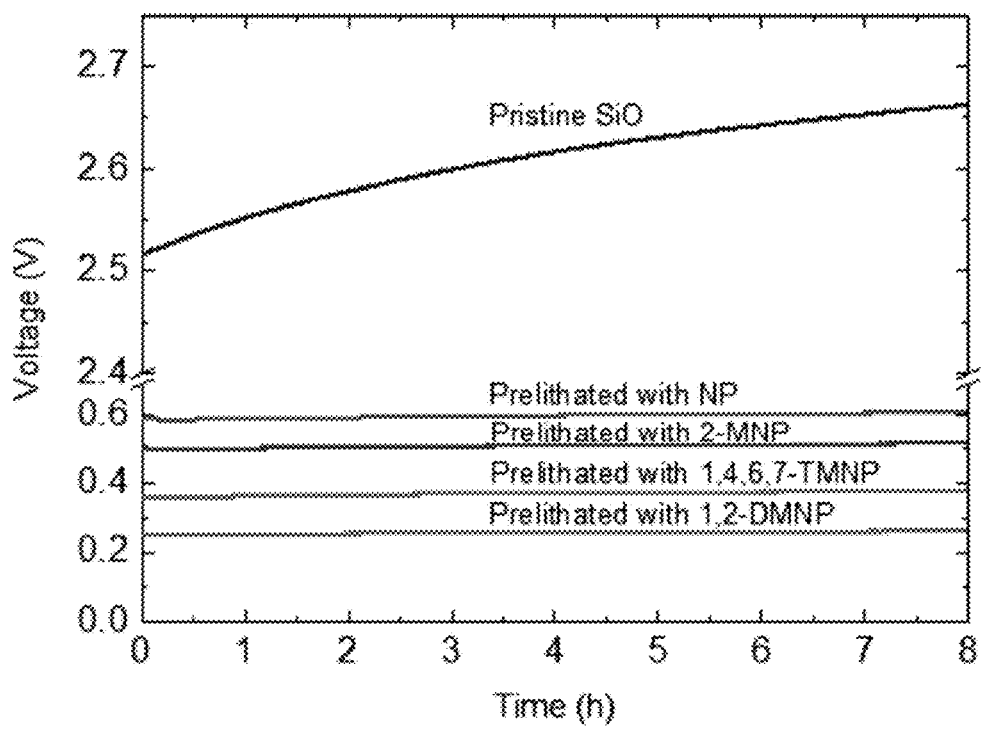
FIG. 5 shows a result of measuring the OCV of a prelithiated $SiO_x$ anode using LAC solutions made of naphthalene derivatives according to an exemplary embodiment of the present disclosure.

In addition, the coulombic efficiency and OCV of the prepared anodes were measured. FIG. 5 shows the result of measuring OCV, and FIG. 6 shows the result of measuring coulombic efficiency.

As shown in FIG. 5, the OCV of the prelithiated SiO electrodes decreased significantly as compared to that of the non-prelithiated pristine SiO electrode. The OCV of the anodes prelithiated using the lithium-naphthalene derivative complex prelithiation solutions (Prelithiated with 2-MNP, Prelithiated with 1,2-DMNP, Prelithiated with 1,4,6,7-TMNP) was further decreased than that of the anode prelithiated using the lithium-naphthalene complex (Prelithiated with NP).

Figure 6:
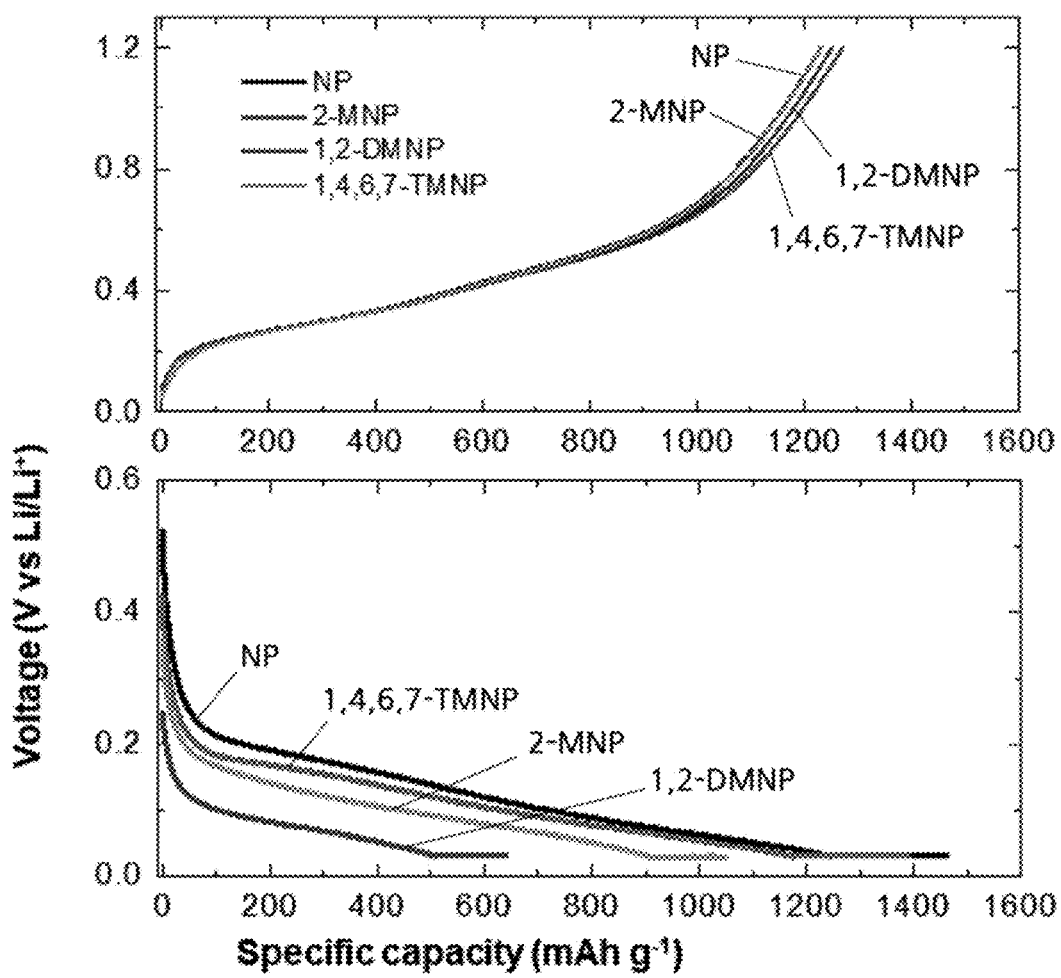
FIG. 6 shows a result of measuring the voltage profile and coulombic efficiency of $SiO_x$ anodes prelithiated with prelithiation solutions including naphthalene derivatives according to an exemplary embodiment of the present disclosure.

In addition, as shown in FIG. 6, a tendency similar to the biphenyl derivatives of Test Examples 1-2 was observed when the naphthalene derivatives were used. Whereas the anode prelithiated using the lithium-naphthalene complex prelithiation solution showed a coulombic efficiency of 84%, the anode prelithiated using the lithium-naphthalene derivative complex prelithiation solution showed improved coulombic efficiency. In particular, the complex of a lithium ion and 1,4,6,7-TMNP and the complex of a lithium ion and 1,2-DMNP showed remarkable increase in coulombic efficiency, which exceeded 100%.

Accordingly, the prelithiation solution and the method for preparing a prelithiated anode using the same according to the present disclosure allow uniform intercalation of lithium ions throughout the anode chemically in a solution via a simple process of immersing the anode in a prelithiation solution having a sufficiently low redox potential as compared to an anode active material and a high degree of prelithiation can be achieved. A prelithiated anode prepared by this method has an ideal initial coulombic efficiency exceeding 100% and a lithium-ion battery with a high energy density can be prepared based thereon. In addition, the prepared anode is advantageously applicable to large-scale production due to superior stability even in dry air.

The foregoing examples and test examples are for illustrative purposes of the present disclosure and the present disclosure is not limited by them. Those of ordinary skill in the art to which the present disclosure belongs will be able to carry out the present disclosure by variously changing the examples. Therefore, the technical scope of protection of the present disclosure should be defined by the appended claims.

What is claimed is:

1. A prelithiation solution comprising a lithium organic complex of an aromatic hydrocarbon derivative, of which at least one benzene ring has a non-hydrogen substitute,
    wherein the aromatic hydrocarbon derivative is one or more selected from a group consisting of compounds represented by any of Chemical Formula 1 and Chemical Formula 2:

[Chemical Formula 1]

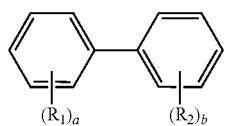

wherein
in Chemical Formula 1,
each of $R_1$ and $R_2$, which are identical to or different from each other, is $C_1$-$C_4$ alkyl,
each of a and b is independently an integer from 0 to 2, wherein at least one is not 0,
if a is 2 or greater, two or more $R_1$'s are identical to or different from each other, and
if b is 2 or greater, two or more $R_2$'s are identical to or different from each other, and
in Chemical Formula 2,

[Chemical Formula 2]

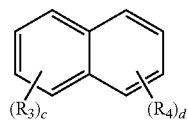

each of $R_3$ and $R_4$, which are identical to or different from each other, is $C_1$-$C_4$ alkyl,
each of c and d is independently an integer from 0 to 2, wherein at least one is not 0,
if c is 2 or greater, two or more $R_3$'s are identical to or different from each other, and
if d is 2 or greater, two or more $R_4$'s are identical to or different from each other.

2. The prelithiation solution according to claim 1, wherein the aromatic hydrocarbon derivative is one or more selected from a group consisting of compounds represented by any of Chemical Formulas 1-1 to 1-3 and 2-1 to 2-3:

[Chemical Formula 1-1]

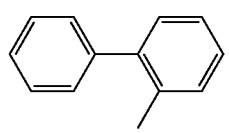

[Chemical Formula 1-2]

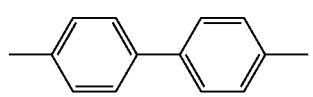

[Chemical Formula 1-3]

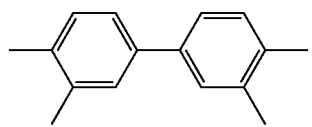

[Chemical Formula 2-1]

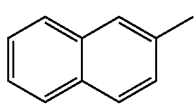

[Chemical Formula 2-2]

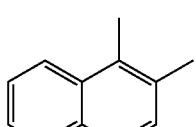

[Chemical Formula 2-3]

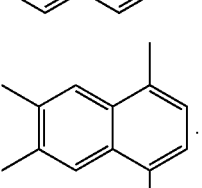

3. The prelithiation solution according to claim 1, wherein a solvent of the prelithiation solution is one or more selected from a group consisting of a cyclic ether and a linear ether.

4. The prelithiation solution according to claim 1, wherein the concentration of the complex in the prelithiation solution is 0.01-5 M.

5. The prelithiation solution according to claim 1, wherein the complex has a redox potential lower than 0.25 V versus Li/Li$^+$.

6. A prelithiated anode including a prelithiation solution according to claim 1.

7. A lithium secondary battery comprising:
    (a) a prelithiated anode according to claim 6,
    (b) a cathode, and
    (c) an electrolyte.

8. A lithium-ion capacitor comprising:
    (a) a prelithiated anode according to claim 6,
    (b) a cathode, and
    (c) an electrolyte.

9. A method for preparing a prelithiated anode, comprising:
(a) a step of preparing an anode comprising an anode active material layer formed on the surface of one or both sides of a current collector; and
(b) a step of preparing a prelithiated anode by immersing the anode in a prelithiation solution comprising a lithium organic complex of an aromatic hydrocarbon derivative, of which at least one benzene ring has a non-hydrogen substitute, wherein the aromatic hydrocarbon derivative is one or more selected from a group consisting of compounds represented by any of Chemical Formula 1 and Chemical Formula 2:

[Chemical Formula 1]

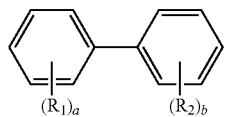

wherein in Chemical Formula 1, each of $R_1$ and $R_2$, which are identical to or different from each other, is $C_1$-$C_4$ alkyl, each of a and b is independently an integer from 0 to 2, wherein at least one is not 0, if a is 2 or greater, two or more $R_1$'s are identical to or different from each other, and if b is 2 or greater, two or more $R_2$'s are identical to or different from each other, and in Chemical Formula 2,

[Chemical Formula 2]

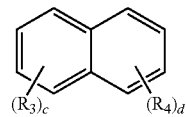

each of $R_3$ and $R_4$, which are identical to or different from each other, is $C_1$-$C_4$ alkyl, each of c and d is independently an integer from 0 to 2, wherein at least one is not 0, if c is 2 or greater, two or more $R_3$'s are identical to or different from each other, and if d is 2 or greater, two or more $R_4$'s are identical to or different from each other.

10. The method for preparing a prelithiated anode according to claim 9, wherein the anode active material is one or more selected from a group consisting of graphite, hard carbon, activated carbon, carbon nanotube, amorphous carbon, silicon, silicon oxide ($SiO_x$), silicide, silicon alloy, silicon carbide, silicon nitride, Ge, Sn, Sb, Al, Ag, Au and $TiO_2$.

11. The method for preparing a prelithiated anode according to claim 9, wherein the immersion of the step (b) is performed at a temperature of −10 to 80° C.

12. The method for preparing a prelithiated anode according to claim 9, wherein the immersion of the step (b) is performed for 0.01-1440 minutes.

* * * * *